(12) United States Patent
Yamano

(10) Patent No.: US 7,221,464 B2
(45) Date of Patent: May 22, 2007

(54) IMAGE RECORDING APPARATUS AND TEST PATTERN FOR EVALUATING RECORDED IMAGE

(75) Inventor: Akira Yamano, Hino (JP)

(73) Assignee: Konica Corporation, Tokyo (JP)

( * ) Notice: Subject to any disclaimer, the term of this patent is extended or adjusted under 35 U.S.C. 154(b) by 958 days.

(21) Appl. No.: 09/995,770

(22) Filed: Nov. 29, 2001

(65) Prior Publication Data

US 2002/0067925 A1 Jun. 6, 2002

(30) Foreign Application Priority Data

Dec. 1, 2000 (JP) .............................. 2000-366698

(51) Int. Cl.
 *G06F 15/00* (2006.01)
(52) U.S. Cl. .................... 358/1.13; 358/1.5; 358/1.14; 358/1.15; 358/406; 358/448; 358/475; 358/501; 358/504; 358/505; 358/506; 358/518; 358/527; 358/531; 347/112; 347/115; 347/129; 347/132; 347/133; 347/236; 347/246; 355/40
(58) Field of Classification Search ................ 358/296, 358/1.15, 1.14, 1.13, 406, 448, 475; 382/298; 347/112, 115, 129, 132, 133; 355/40
 See application file for complete search history.

(56) References Cited

U.S. PATENT DOCUMENTS

| 4,344,683 | A | * | 8/1982 | Stemme | 396/317 |
|---|---|---|---|---|---|
| 5,721,623 | A | * | 2/1998 | Boxma | 358/448 |
| 5,883,985 | A | * | 3/1999 | Pourjavid | 382/274 |
| 5,896,202 | A | * | 4/1999 | Ozaki | 358/296 |
| 6,573,507 | B1 | * | 6/2003 | Agano | 250/370.09 |

* cited by examiner

*Primary Examiner*—Twyler Lamb
*Assistant Examiner*—Vu B. Hang
(74) *Attorney, Agent, or Firm*—Finnegan, Henderson, Farabow, Garrett & Dunner, L.L.P.

(57) ABSTRACT

The invention concerns an image recording apparatus suitable for forming a medical image that is used for a medical diagnosis, and a test pattern for evaluating a quality of the medical image. The image recording apparatus includes a printing section to either the medical image or the test pattern on the recording medium, based on image date; a printing-condition setting section to set a printing condition for printing the test pattern; and a printing-condition displaying section to display the printing condition set by the printing-condition setting section. The printing section prints at least one of a sharpness-evaluating pattern and a granularity-evaluating pattern.

81 Claims, 9 Drawing Sheets

FIG. 6(a)
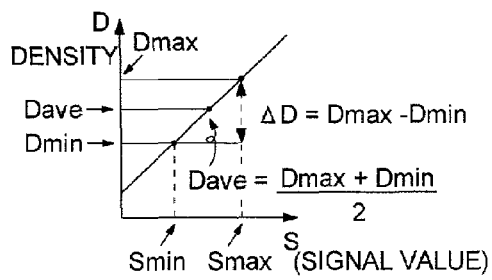

D = 1.2  1.6  2.0
FIG. 6(b)
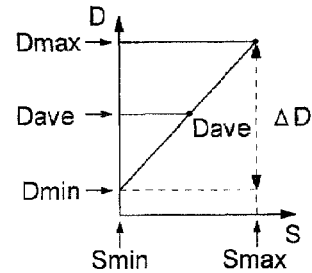
D = 0.2  1.6  3.0
DENSITY SETTING METHOD
| EXAMPLE 1 | $D_{max}$, $D_{min}$ |
| EXAMPLE 2 | $D_{ave}$, $\Delta D$ (or $\Delta D/2$) |
FIG. 6(c)
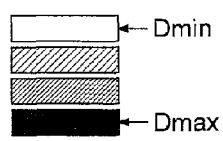
FIG. 6(d)
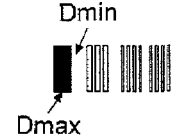
FIG. 6(e)
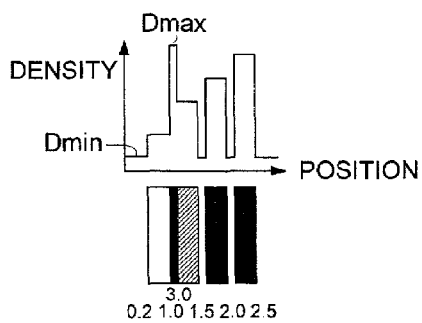
FIG. 6(f)
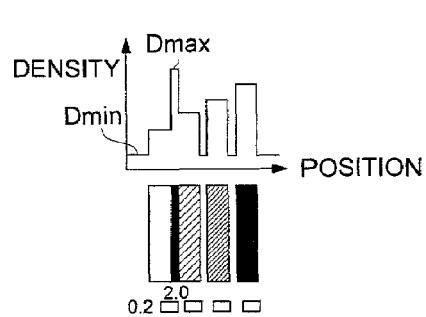
FIG. 6(g)
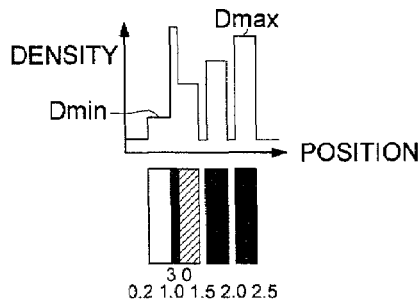
FIG. 6(h)
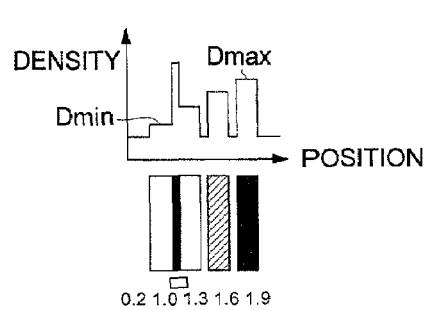
※ ☐ DENSITY UNKNOWN BEFORE MEASUREMENT

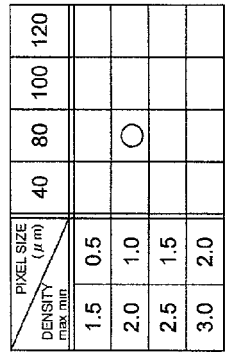
FIG. 7 (a)
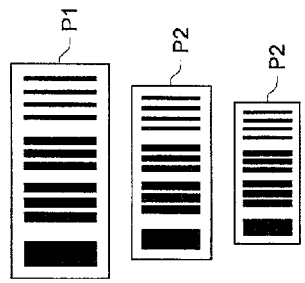
FIG. 7 (b)
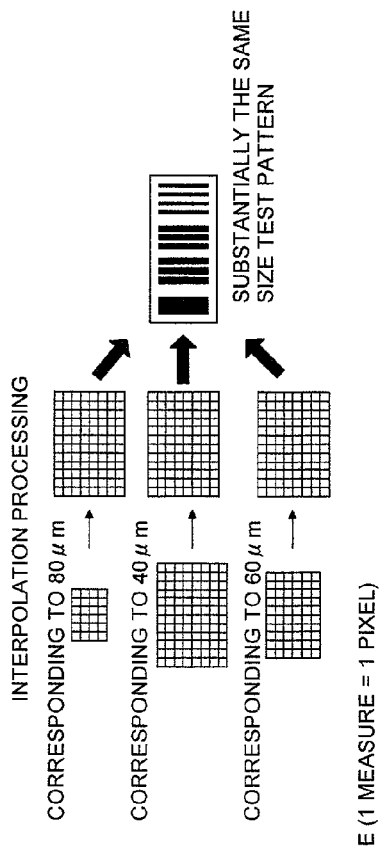
FIG. 7 (c)
FIG. 7 (e)
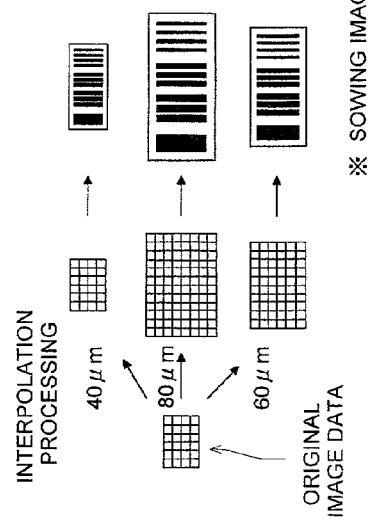
FIG. 7 (d)

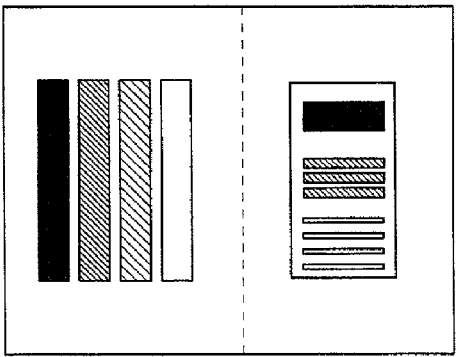
FIG. 8(c) 180° ROTATION
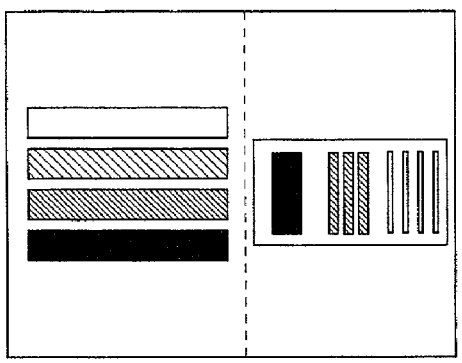
FIG. 8(b) 90° ROTATION
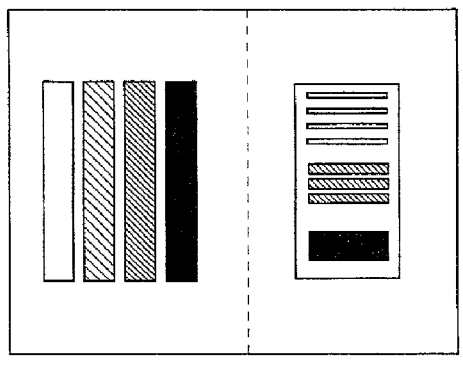
FIG. 8(a) NO ROTATION
MAIN SCANNING
SUB-SCANNING

IMAGE RECORDING APPARATUS AND TEST PATTERN FOR EVALUATING RECORDED IMAGE

BACKGROUND OF THE INVENTION

The present invention relates to an image recording apparatus, and in particular, to an image recording apparatus suitable for forming a medical image that is used for diagnosis or used for reference, and to a test pattern for evaluating the same.

In the medical field, radiation images have so far been formed on silver halide films to be used for diagnoses made by medical doctors. In recent years, however, technologies for processing digital images have made progress, and there has been increased the number of radiographing apparatuses (modalities) for medical use each being capable of outputting digital image data corresponding to images obtained through radiographing. If images obtained through radiographing can be stored in the form of digital image data, image processing is easy, less space is required for storage, and aging deterioration of an image is hardly caused even when the digital image data are stored for a long time, which is an advantage.

However, even if images obtained through radiographing are stored in a form of a digital signal, a form for visualization is a problem. Namely, when radiation images are offered for diagnoses made by medical doctors, image quality, which is the same as that of a household printer, is not sufficient, and image forming at higher image quality is needed. In an image recording apparatus for recording the medical images as stated above, it is a problem how to make the initial image quality forming capability to be high, and to keep the initial capability for a long time. An image quality control method that is most simple is to make a maintenance contract with a third party. For example, if a user can judge that image quality of outputted images is deteriorated by sudden deterioration of recording accuracy caused by some troubles of the image recording apparatus, the user has only to request the maintenance each time. However, when image quality is lowered gradually day after day, the user sometimes fails to judge the deterioration of image quality, and further, when the user cannot identify the cause of the deterioration of image quality, it sometimes takes a long time to identify the cause before the start of repair.

In this case, in the case of maintenance of the image recording apparatus, it is possible to grasp the deterioration of image quality and to identify the cause therefore to a certain extent, by inputting test pattern image data in the image recording apparatus and by investigating printed out test pattern images. To carry out image quality control on the user side by advancing the aforesaid system, it can be considered that the test pattern image is outputted periodically by the user so that image quality may be checked. In this case, if the test pattern image data are built in the image recording apparatus, it is possible to output a test pattern image in case of need, and it is further possible to evaluate by using the test pattern image even in the case of nonperiodical inspection by a person other than the user such as an inspection for shipment and a maintenance.

Incidentally, as a physical evaluation item for image quality, there are mainly given three items of sharpness, granularity and gradation. For forming medical images with high image quality, every one of the aforesaid three evaluation items is required to be included. For improving image quality, each evaluation item needs to be evaluated separately and its cause needs to be grasped. Therefore, the test pattern for evaluating each evaluation item is necessary. Further, with respect to test patterns for evaluating sharpness and granularity, in particular, it is important for image quality evaluation that test patterns for various conditions can be recorded, and therefore, it is preferable that output density, an output image size, a pixel size and a format are set optionally and are recorded on a recording medium.

However, in many cases, a conventional test pattern stored under the state of image data in each of a medical image recording apparatus is a density adjusting test pattern for correcting mainly look-up table (LUT) gradation characteristics. Though the gradation can be evaluated by this test pattern, the test pattern is not suitable for physical evaluation such as granularity and sharpness.

Though the test pattern recommended by the Society of Motion Picture and Television Engineers (SMPTE) (SMPTE pattern) is a test pattern that is also capable of evaluating granularity and sharpness of image quality, on the other hand, all it can do is just evaluation under the specific recording conditions (density and spatial frequency). If LUT of the image recording apparatus is changed in this case, it can also be used as a test pattern whose density is changed. However, it has a problem that it is not suitable for measurement because it is not an exclusive test pattern for obtaining physical evaluation values such as root mean square (RMS) and Weiner spectrum (WS). If the output size is changed, it can be used also as a test pattern for evaluating sharpness wherein a spatial frequency is changed. However, it has a problem that it is not suitable for measurement because it is not an exclusive test pattern for obtaining physical evaluation values such as sine wave response filter (SWRF) and modulation transfer function (MTF).

Further, an SMPTE pattern is a test pattern wherein geometrical patterns are collected so that granularity, sharpness and gradation of image quality may be evaluated separately, and it can be said that a test pattern for combined evaluation prepared by assuming diagnoses has not been available.

Incidentally, the test pattern disclosed in TOKKAIHEI No. 10-157088 is for judging the image lasting quality, and the test pattern disclosed in TOKKAIHEI No. 11-48464 is for detecting inferior jetting of ink in an ink jet recording apparatus and thereby for improving the gradation, and both of them are not a test pattern for conducting evaluation of sharpness and granularity. Furthermore, the invention disclosed in TOKKAI No. 2000-138952 is one related to the test pattern for evaluating the sharpness in a period up to preparation of image data, and it is not one for evaluating sharpness of outputted images.

SUMMARY OF THE INVENTION

In view of the problems in the prior art stated above, an object of the invention is to provide an image recording apparatus wherein test patterns for physical evaluation can be recorded on a recording medium under the various established recording conditions (output density, sizes and formats), in an image recording apparatus especially for medical use in which image data corresponding to test pattern images are stored.

Further, another object of the invention is to provide an image recording apparatus for recording the test pattern that is sufficient for physical evaluation such as granularity and sharpness and makes the density measurement to be easy.

Further object is to provide an image recording apparatus capable of recording the test pattern for combined evaluation that can evaluate image quality of an image objectively.

Incidentally, in the following description, the term of "pattern element" denotes the same and identical meaning of the term of "chart element" residing in the test pattern.

Accordingly, to overcome the cited shortcomings, the abovementioned object of the present invention can be attained by image-recording apparatus described as follow.

(1) An apparatus for printing a medical image on a recording medium, comprising: a printing section to print either the medical image or a test-pattern for evaluating a quality of the medical image, on the recording medium, based on image data; a printing-condition setting section to set a printing condition for printing the test-pattern; and a printing-condition displaying section to display the printing condition set by the printing-condition setting section; wherein the printing section prints at least one of a sharpness-evaluating pattern and a granularity-evaluating pattern.

(2) The apparatus of item 1, further comprising: an image data creating section to create a new image data based on the printing condition set by the printing-condition setting section.

(3) The apparatus of item 1, further comprising: a storing section to store the image data; and wherein the storing section stores at least one set of image data corresponding to the test-pattern to be printed on the recording medium.

(4) The apparatus of item 1, wherein a plurality of test-patterns, being substantially the same each other, can be printed on the recording medium.

(5) The apparatus of item 4, wherein border lines between the plurality of test-patterns are also printed on the recording medium.

(6) The apparatus of item 1, wherein the printing-condition setting section includes a density-setting section to set a density of the medical image, based on a combination of at least one of factors including: a maximum density Dmax of the test-pattern in term of either a transmission density or a reflection density; a minimum density Dmin of the test-pattern corresponding to the maximum density Dmax; an average value Dave of the maximum density Dmax and the minimum density Dmin; and a density difference ΔD, where ΔD=Dmax−Dmin.

(7) The apparatus of item 6, further comprising: an image data creating section to create a new image data based on the density set by the density-setting section.

(8) The apparatus of item 6, wherein both the test-pattern and the density set by the density-setting section are printed on the recording medium.

(9) The apparatus of item 6, further comprising: a storing section to store the image data; and wherein the storing section stores at least one set of image data corresponding to the test-pattern to be printed on the recording medium.

(10) The apparatus of item 9, further comprising: an image data selecting section to select any one of image data sets, which are stored in advance in the storing section corresponding to densities set by the density-setting section; and wherein the storing section stores at least two of the image data sets, which are different each other in image-signal values so that test-patterns printed on the recording medium are substantially the same each other except the densities.

(11) The apparatus of item 9, further comprising: an image data processing section to generate new image data sets corresponding to the densities by processing the image data sets stored in advance in the storing section.

(12) The apparatus of item 1, wherein the printing-condition setting section includes a pixel-size setting section to set a pixel-size of one pixel included in the image data; and further comprising: an interpolate-processing section to apply an interpolate-processing for either expansion or a reduction of the medical image to the image data, in response to the pixel-size set by the pixel-size setting section.

(13) The apparatus of item 12, further comprising: an image data creating section to create a new image data based on the pixel-size set by the pixel-size setting section.

(14) The apparatus of item 12, wherein the printing-condition setting section includes an interpolate-processing method setting section to set interpolate-processing method for either expanding or a reducing of the medical image.

(15) The apparatus of item 12, wherein both the test-pattern and interpolate-processing information pertaining to the interpolate-processing applied by the interpolate-processing section are printed on the recording medium, and the interpolate-processing information includes at least one of factors including the pixel-size, an interpolate-processing method and an interpolate-scaling factor.

(16) The apparatus of item 12, further comprising: a storing section to store the image data; and wherein the storing section stores at least one set of image data corresponding to the test-pattern to be printed on the recording medium.

(17) The apparatus of item 16, further comprising: an image data selecting section to select any one of image data sets, which are stored in advance in the storing section corresponding to pixel-sizes set by the pixel-size setting section; and wherein the storing section stores at least two of the image data sets, which are different each other in an amount of image data so that test-patterns printed on the recording medium are substantially the same each other except image-sizes of the test-patterns.

(18) The apparatus of item 16, further comprising: an image data processing section to generate new image data sets corresponding to the pixel-sizes by processing the image data sets stored in advance in the storing section.

(19) The apparatus of item 1, further comprising: an image-direction setting section to set an image-direction of the medical image printed on the recording medium.

(20) The apparatus of item 19, further comprising: an image data creating section to create a new image data based on the image-direction set by the image-direction setting section.

(21) The apparatus of item 19, wherein both the test-pattern and information pertaining to the image-direction, set by the image-direction setting section, are printed on the recording medium.

(22) The apparatus of item 19, further comprising: a storing section to store the image data; and wherein the storing section stores at least one set of image data corresponding to the test-pattern to be printed on the recording medium.

(23) The apparatus of item 22, further comprising: an image data selecting section to select any one of image data sets, which are stored in advance in the storing section corresponding to image-directions, set by the image-direction setting section; and wherein the storing section stores at least two of the image data sets, which are different each other in the image-direction so that test-patterns printed on the recording medium are substantially the same each other except image-directions of the test-patterns.

(24) The apparatus of item 22, further comprising: an image data processing section to generate new image data sets corresponding to image-directions, set by the image-direction setting section, by processing the image data sets stored in advance in the storing section.

(25) The apparatus of item 1, further comprising: a pattern-number setting section to set a number of test-patterns to be printed on the recording medium.

(26) The apparatus of item 25, wherein a plurality of test-patterns can be printed on the recording medium.

(27) The apparatus of item 26, wherein the printing-condition setting section includes a combination setting section to set a combination of test-patterns when the pattern-number setting section sets a number of the test-patterns, and the combination of the test-patterns is one of combinations of different evaluating items, different densities, different pixel-sizes, different interpolate-processing methods, different interpolate-scaling factors and different image-directions.

(28) The apparatus of item 26, wherein, when the pattern-number setting section sets a number of the plurality of test-patterns, border lines between the plurality of test-patterns are also printed on the recording medium.

(29) The apparatus of item 1, wherein the sharpness-evaluating pattern has more than four kinds of pattern elements, special frequencies of which are different relative to each other and in each of which 1 to 20 periods of each spatial frequency are aligned.

(29-1) The apparatus of item 29, wherein the apparatus is a ink-jet printer, and the sharpness-evaluating pattern includes three or more pattern elements having a spatial frequency being equal to or more than 2.0 cycle/mm at a normalized portion.

(30) The apparatus of item 29, wherein a spatial frequency of a normalized pattern element, being one of the pattern elements and having a lowest spatial frequency among them, is not greater than 0.5 cycle/mm.

(31) The apparatus of item 30, wherein 5 to 20 periods of each spatial frequency are aligned in each of the pattern elements other than the normalized pattern element.

(32) The apparatus of item 29, wherein a width of each of the pattern elements in a read-scanning direction is in a range of 10 to 200 mm.

(33) The apparatus of item 1, further comprising: a storing section to store the image data; and wherein the storing section stores at least one set of image data corresponding to the sharpness-evaluating pattern to be printed on the recording medium.

(34) The apparatus of item 33, wherein at least two sets of image data are stored in the storing section so that numbers of pattern elements in sharpness-evaluating patterns, to be printed on the recording medium, are different each other.

(35) The apparatus of item 34, further comprising: an image data selecting section to select any one of image data sets, which are stored in advance in the storing section corresponding to the numbers of the pattern elements.

(36) The apparatus of item 34, further comprising: an image data processing section to generate new image data sets corresponding to the numbers of the pattern elements by processing the image data sets stored in advance in the storing section.

(37) The apparatus of item 33, further comprising: an image data creating section to create a new image data based on a number of pattern elements in the sharpness-evaluating pattern.

(38) The apparatus of item 30, wherein the printing-condition setting section includes a spatial frequency setting section to set the spatial frequency of the pattern element.

(39) The apparatus of item 38, wherein more than two image data sets in respect to sharpness-evaluating patterns, in which at least one of special frequencies of pattern elements is/are different relative to each other, are stored in a storing section.

(40) The apparatus of item 39, further comprising: an image data selecting section to select any one of the image data sets, which are stored in advance in the storing section corresponding to the special frequencies of the pattern elements.

(41) The apparatus of item 38, further comprising: an image data processing section to generate new image data sets corresponding to special frequencies of pattern elements by processing the image data sets stored in advance in the storing section.

(42) The apparatus of item 29, wherein the printing-condition setting section includes a profiling-axis setting section to set a profiling-axis of a pattern element.

(43) The apparatus of item 42, wherein the profiling-axis setting section sets the profiling-axis at either a density, a lightness or a transmittance.

(44) The apparatus of item 42, wherein at least two of image data sets, which are different each other in image-signal values so that sharpness-evaluating patterns printed on the recording medium are substantially the same each other except the profiling-axis, are stored in a storing section.

(45) The apparatus of item 42, further comprising: an image data selecting section to select any one of image data sets, which are stored in advance in a storing section corresponding to the profiling-axis of the pattern elements.

(46) The apparatus of item 42, further comprising: an image data processing section to generate new image data sets corresponding to the profiling-axis of the pattern element by processing the image data sets stored in advance in a storing section.

(47) The apparatus of item 42, further comprising: an image data creating section to create a new image data based on the profiling-axis of the pattern element.

(48) The apparatus of item 29, wherein the printing-condition setting section includes a waveform setting section to set a waveform of a pattern element at either a rectangular wave, a chopping wave or a sine wave.

(49) The apparatus of item 48, further comprising: an image data selecting section to select any one of image data sets, which are stored in advance in a storing section corresponding to the waveform of the pattern element.

(50) The apparatus of item 48, further comprising: an image data processing section to generate new image data sets corresponding to the waveform of the pattern element by processing the image data sets stored in advance in a storing section.

(51) The apparatus of item 1, wherein the granularity-evaluating pattern has 3 to 20 uniform density regions, each of which has a uniform density being different from others and includes an area of 5 mm×5 mm but does not exceed an area of 200 mm×200 mm.

(52) The apparatus of item 51, wherein the printing-condition setting section includes a density-region setting section to set a number of the uniform density regions.

(53) The apparatus of item 52, further comprising: an image data selecting section to select any one of image data sets, which are stored in advance in a storing section corresponding to the number of the uniform density regions set by the density-region setting section.

(54) The apparatus of item 52, wherein, when design diffusion densities of the uniform density regions are not greater than 1.5, each of lines formed between the uniform density regions has a density being not smaller than 2.0.

(55) An apparatus for printing a medical image on a recording medium, comprising: a storing section to store a plurality of image data sets each of which corresponds to either a structure of a human body-part or a test-pattern including an illustration of the structure; an image data selecting section to select at least one of the image data sets, corresponding to a kind of an image capturing device coupled to the apparatus; and a printing section to print the test-pattern on the recording medium, based on one of the image data sets selected by the image data selecting section.

(56) An apparatus for printing a medical image on a recording medium, comprising: a storing section to store a plurality of image data sets each of which corresponds to either a structure of a human body-part or a test-pattern including an illustration of the structure; and a printing section to print both the test-pattern and information indicating the test-pattern on the recording medium, based on one of the image data sets corresponding to the test-pattern.

(57) A test-pattern employed for an image-recording apparatus, wherein, with respect to either a transmission density or a reflection density, the test-pattern is set on the basis of a density combination of at least two of factors including: a maximum density Dmax of an image-pattern; a minimum density Dmin of the image-pattern; an average value Dave of the maximum density Dmax and the minimum density Dmin; and a density difference $\Delta D$, where $\Delta D = Dmax - Dmin$.

Further, to overcome the abovementioned problems, other image-recording apparatus, embodied in the present invention, will be described as follow:

(58) An image-recording apparatus, characterized in that, in the image-recording apparatus, which records image information on a recording medium based on image data, a print condition setting means (hereinafter, serving as a printing-condition setting section) that establishes print conditions of the test pattern is provided.

(59) An image-recording apparatus, characterized in that, the image-recording apparatus can records a test pattern for evaluating sharpness of the image recording apparatus (hereinafter, serving as a sharpness-evaluating pattern) on a recording medium, and the test pattern has a pattern elements which includes four or more different spatial frequency sections in which 1–20 periods of the spatial frequency are aligned.

(60) An image-recording apparatus, characterized in that, the image-recording apparatus is represented by a test pattern that is recorded on a recording medium from the image recording apparatus stated above for evaluating granularity of the image recording apparatus, wherein there may be recorded the test pattern for evaluating granularity (hereinafter, serving as a granularity-evaluating pattern) having 3–20 uniform density regions each being different from others but almost uniform in itself in terms of density and having an area ranging from 5×5 mm to 200×200 mm.

(61) An image-recording apparatus, characterized in that, a storage means (hereinafter, serving as a storing section) that stores a plurality of image data corresponding to the structure of a part of a human body or to a test pattern wherein the aforesaid structure is copied, a selecting means that selects at least one of the aforesaid image data in accordance with a connected radiographing equipment, and a recording means that records a test pattern on a recording medium based on the selected image data, are provided.

(62) An image-recording apparatus, characterized in that, a storage means that stores a plurality of image data corresponding to the structure of a part of a human body or to a test pattern wherein the aforesaid structure is copied, and a recording means that records a test pattern on a recording medium based on the image data and records information that shows the test pattern are provided.

Since the image-recording apparatus of item 58 has therein a print condition setting means that establishes print conditions of the test pattern in an image recording apparatus for recording image information on a recording medium based on image data, it is possible for the first image recording apparatus to record the test pattern on a recording medium and to evaluate image quality appropriately accordingly, by selecting the test pattern that is optimum for evaluation in accordance with, for example, characteristics of the image recording apparatus and the type of the image to be recorded, and by setting the print conditions with the print condition setting means.

Further, it is preferable that at least one of the test pattern for evaluating sharpness and the test pattern for evaluating granularity can be recorded, because at least one of sharpness and granularity of the image can be evaluated.

If there is provided a print condition display means that displays the print condition established by the print condition setting means, the condition under which the test pattern is set is known, which is convenient. Incidentally, it is preferable that a test pattern image is also displayed when the print condition is displayed.

The print condition setting means is characterized to include a density setting means (hereinafter, serving as a density-setting setting section) that sets density, which is preferable because the test pattern desired with respect to density can be obtained.

When the density setting means stated above is a means to set density with a combination of not less than two of the maximum density Dmax in the test pattern, the minimum density Dmin in the test pattern, average value Dave of Dmax and Dmin in the test pattern and density difference $\Delta D$ between Dmax and Dmin in the test pattern, in transmission density or reflection density, it is easy to set density, which is preferable.

When an image data storage means that stores image data is provided, retrieval of image data can be carried out when necessary, which is preferable.

It is further preferable that at least one of image data corresponding to the test pattern recorded on the recording medium is stored.

It is further preferable that two or more of image data having different image signal values which make the test patterns recorded on the recording medium to be almost the same except density are stored by the image data storage means.

Further, it is preferable that there is provided an image data selecting means (hereinafter, serving as an image data selecting section) that selects any of the image data stored in advance according to established density set by the density setting means.

Further, if there is provided an image data processing means (hereinafter, serving as an image data processing section) that processes the image data stored in advance according to the established density and processes them to new image data corresponding to the established density, evaluation at higher accuracy can be carried out, because it is possible to prepare image data with optional density by the aforesaid processing. Incidentally, an embodiment for the processing includes stepwise increasing or decreasing of density of the total chart corresponding to original image data, and optional increasing or decreasing of density on at least a part of the chart.

It is preferable to provide an image data preparing means (hereinafter, serving as a image data creating section) that prepares new image data in accordance with the established density.

It is further preferable if there is provided an image data preserving means that preserves new image data obtained by the image data preparing means or by the image data processing means on the storage means.

It is preferable that the established density and the test pattern are stored together on the recording medium.

Further, it is preferable that the print condition setting means includes a pixel size setting means (hereinafter, serving as a pixel-size setting section) that sets the pixel size corresponding to one pixel of image data.

It is preferable that an interpolation processing means (hereinafter, serving as an interpolate-processing section) that conducts enlargement or reduction interpolation processing on image data corresponding to established pixel size established by the pixel size setting means is provided, and recording is conducted on a recording medium in accordance with the established pixel size.

It is preferable that the print condition setting means is provided with an interpolation processing method setting means (hereinafter, serving as an interpolate-processing method setting section) that sets an enlargement interpolation processing or a reduction interpolation processing.

Further, it is preferable that an image data storage means that stores image data is provided.

It is preferable that at least one of image data corresponding to the test pattern recorded on the recording medium is stored by the image data storage means.

It is further preferable that two or more of image data having different data amount which make the test patterns recorded on the recording medium to be almost the same except output size are stored by the image data storage means.

It is preferable that there is provided an image data selecting means that selects either of the image data stored in advance corresponding to the established pixel size.

Further, it is preferable that there is provided an image data processing means that processes the image data stored in advance according to the established pixel size and processes them to new image data corresponding to the established pixel size.

It is preferable to provide an image data preparing means that prepares new image data corresponding to the established pixel size.

It is further preferable if there is provided an image data preserving means that preserves new image data obtained by the image data preparing means or by the image data processing means on the storage means.

It is preferable that interpolation processing information relating to the interpolation processing conducted by the interpolation processing means is stored on the recording medium together with the test pattern.

It is preferable that the interpolation processing information is represented by a pixel size.

It is preferable that the interpolation processing information is represented by an interpolation processing method.

It is further preferable that the interpolation processing information is represented by an interpolate-scaling factor.

It is preferable that the print condition setting means includes an image direction setting means (hereinafter, serving as an image-direction setting section) that establishes a direction of the image recorded.

It is further preferable that an image data storage means that stores image data is provided.

It is preferable that at least one of image data corresponding to the test pattern to be recorded on the recording medium is stored by the image data storage means.

It is further preferable that two or more of image data having different image direction which make the test patterns recorded on the recording medium to be almost the same except the image direction are stored by the image data storage means.

Further, it is preferable that there is provided an image data selecting means that selects any of the image data stored in advance according to established image direction set by the recording direction setting means.

Further, it is preferable that there is provided an image data processing means that processes the image data stored in advance according to the established image direction and processes them to new image data corresponding to the established image direction.

It is further preferable that an image data preparing means that prepares new image data corresponding to the established image direction is provided.

It is further preferable if there is provided an image data preserving means that preserves new image data obtained by the image data preparing means or by the image data processing means on the storage means.

It is further preferable that image direction information relating to the image direction is stored on the recording medium together with the test pattern.

It is further preferable that the print condition setting means includes a test pattern number setting means (hereinafter, serving as a pattern-number setting section) that sets the number of test patterns to be recorded on a sheet of recording medium.

It is preferable that a plurality of test patterns, which are mostly the same can be recorded.

It is further preferable that the print condition setting means includes a combination setting means that sets combination of test patterns when the test pattern number setting means sets plural test patterns.

It is preferable that the combination is one that is different from the combination of the test pattern in terms of evaluation items.

It is preferable that the combination is one that is different from the combination of the test pattern in terms of density.

It is preferable that the combination is one that is different from the combination of the test pattern in terms of a pixel size.

It is preferable that the combination is one that is different from the combination of the test pattern in terms of an interpolation processing method.

It is preferable that the combination is one that is different from the combination of the test pattern in terms of an interpolate-scaling factor.

It is preferable that the combination is one that is different from the combination of the test pattern in terms of an image direction.

It is preferable that a boundary line is recorded between adjoining test patters when plural test patterns are set by the test pattern number setting means.

The image-recording apparatus of item 59 is represented by a test pattern that is recorded on a recording medium from the image recording apparatus stated above for evaluating sharpness of the image recording apparatus, wherein a pattern element equipped with four or more different spatial frequency sections is provided, and the test pattern for evaluating sharpness in which 1–20 cycles are arranged continuously can be recorded, and thereby, evaluation of sharpness can be conducted properly by the test pattern.

It is further preferable that a spatial frequency owned by a normalized pattern element is not more than 0.5 cycle/mm in the normalized pattern element representing the pattern element having the lowest spatial frequency among the aforesaid pattern elements.

It is further preferable that 5–20 cycles are arranged continuously in a pattern element to be normalized representing a pattern element wherein the normalized pattern element among the pattern elements is excluded.

It is further preferable if a width of a pattern element is in a range of 10–200 mm when recorded on a recording medium.

It is preferable if all pattern elements are arranged to be almost in parallel with each other when recorded on a recording medium.

It is further preferable that the image recording apparatus has therein a print condition setting means, and the print condition setting means includes a pattern element number setting means which sets the number of pattern elements.

It is preferable that an image data storage means that stores image data is provided.

It is preferable that at least one of image data corresponding to the aforesaid test pattern for evaluating sharpness recorded on the recording medium is stored by the image data storage means.

It is preferable that two or more image data, which make the number of pattern elements on the test patterns recorded on the recording medium to be different, are stored by the image data storage means.

Further, it is preferable that there is provided an image data selecting means that selects any of the image data stored in advance according to established number of pattern elements established by the pattern element number setting means pixel size.

Further, it is preferable that there is provided an image data processing means that processes the image data stored in advance according to the established pattern element number and processes them to new image data corresponding to the established pattern element number.

It is preferable that an image data preparing means that prepares new image data corresponding to the aforesaid established pattern element number.

It is further preferable if there is provided an image data preserving means that preserves new image data obtained by the image data preparing means or by the image data processing means on the storage means.

It is further preferable that the image recording apparatus has therein a print condition setting means and the print condition setting means includes a pattern element spatial frequency number setting means (hereinafter, serving as a spatial-frequency setting section) which sets the number of spatial frequency of the pattern elements.

It is preferable that an image data storage means that stores image data is provided.

It is preferable that at least one of image data corresponding to the aforesaid test pattern for evaluating sharpness recorded on the recording medium is stored by the image data storage means.

It is preferable that not less than two of image data wherein at least one is different in terms of spatial frequency of pattern elements of the test patterns for evaluating sharpness to be recorded on the recording medium are stored by the image data storage means.

Further, it is preferable that there is provided an image data selecting means that selects any of the image data stored in advance according to established pattern elements spatial frequency established by the pattern element spatial frequency setting means.

Further, it is preferable that there is provided an image data processing means that processes the image data stored in advance according to the established pattern element spatial frequency and processes them to new image data corresponding to the established pattern element spatial frequency.

It is further preferable that an image data preparing means that prepares new image data corresponding to the established pattern element spatial frequency is provided.

It is further preferable if there is provided an image data preserving means that preserves new image data obtained by the image data preparing means or by the image data processing means on the storage means.

It is further preferable that spatial frequency information relating to the established pattern element spatial frequency is stored on the recording medium together with the test pattern for evaluating sharpness.

It is preferable that the image recording apparatus has therein a print condition setting means, and the print condition setting means includes a pattern element profiling-axis setting means (hereinafter, serving as a profiling-axis setting section) that sets the profiling-axis of the pattern element.

It is further preferable that the profiling-axis is set to density by the pattern element profiling-axis setting means.

It is further preferable that the profiling-axis is set to transmittance by the pattern element profiling-axis setting means.

It is further preferable if there is provided an image data storage means that stores image data corresponding to the test pattern for evaluating sharpness.

It is preferable that at least one of image data corresponding to the aforesaid test pattern for evaluating sharpness recorded on the recording medium is recorded by the image data storage means.

Further, with regard to data having different image signal values wherein the test patterns for evaluating sharpness to be recorded on the recording medium are mostly the same with the exception of a profiling-axis, it is preferable that two or more of the data are stored by the image data storage means.

Further, it is preferable that there is provided an image data selecting means that selects any of the image data stored in advance according to established pattern elements profiling-axis established by the pattern element profiling-axis setting means.

Further, it is preferable that there is provided an image data processing means that processes the image data stored in advance according to the established pattern element profiling-axis and processes them to new image data corresponding to the established pattern element profiling-axis.

It is further preferable that an image data preparing means that prepares new image data corresponding to the established pattern element profiling-axis is provided.

It is further preferable if there is provided an image data preserving means that preserves new image data obtained by the image data preparing means or by the image data processing means on the storage means.

It is further preferable that profiling-axis information relating to the established pattern element profiling-axis is stored on the recording medium together with the test pattern.

It is preferable that the image recording apparatus has therein a print condition setting means, and the print condition setting means includes a pattern element wave form setting means (hereinafter, serving as a waveform setting section) that sets the wave form of the pattern element.

It is further preferable that the pattern element wave form is set to a rectangular wave by the pattern element wave setting means when the profiling-axis is density.

It is further preferable that the pattern element wave form is set to a sine wave by the pattern element wave setting means when the profiling-axis is density.

It is further preferable that the pattern element wave form is set to a chopping wave by the pattern element wave setting means when the profiling-axis is density.

It is further preferable that the pattern element wave form is set to a sine wave by the pattern element wave setting means when the profiling-axis is transmittance.

It is further preferable that the pattern element wave form is set to a chopping wave by the pattern element wave setting means when the profiling-axis is transmittance.

It is further preferable that an image data storage means that stores image data corresponding to test patterns for evaluating sharpness.

It is preferable that at least one of image data corresponding to the aforesaid test pattern for evaluating sharpness recorded on the recording medium is recorded by the image data storage means.

Further, with regard to data having different image signal values wherein the test patterns for evaluating sharpness to be recorded on the recording medium are mostly the same with the exception of a pattern element wave form, it is preferable that two or more of the data are stored by the image data storage means.

Further, it is preferable that there is provided an image data selecting means that selects any of the image data stored in advance according to established pattern elements wave form established by the pattern element wave form setting means.

Further, it is preferable that there is provided an image data processing means that processes the image data stored in advance according to the established pattern element wave form and processes them to new image data corresponding to the established pattern element wave form.

It is further preferable that an image data preparing means that prepares new image data corresponding to the established pattern element wave form is provided.

It is further preferable if there is provided an image data preserving means that preserves new image data obtained by the image data preparing means or by the image data processing means on the storage means.

It is further preferable that wave form information relating to the established pattern element wave form is stored on the recording medium together with the test pattern.

Since the image recording apparatus of item 60 is represented by a test pattern that is recorded on a recording medium from the image recording apparatus stated above for evaluating granularity of the image recording apparatus, wherein there may be recorded the test pattern for evaluating granularity having 3–20 uniform density regions each being different from others but almost uniform in itself in terms of density and having an area ranging from 5×5 mm to 200×200 mm, it is preferable that granularity is evaluated properly by the aforesaid test patter.

It is further preferable that one uniform density region to be recorded is in a size ranging from 10×30 mm to 200×200 mm.

It is further preferable that one uniform density region to be recorded is in a size ranging from 10×30 mm to 50×100 mm.

It is preferable that the image recording apparatus has therein a print condition setting means, and the print condition setting means includes a uniform density region number setting means (hereinafter, serving as a density-region setting section) that sets the number of the uniform density regions.

It is further preferable that an image data storage means that stores image data corresponding to the test pattern for granularity.

It is preferable that at least one of image data corresponding to the aforesaid test pattern for evaluating granularity recorded on the recording medium is stored by the image data storage means.

Further, with regard to image data wherein the number of uniform density regions is different in the test patterns for evaluating granularity to be recorded on the recording medium, it is preferable that two or more of the aforesaid image data are stored by the image data storage means.

Further, it is preferable that there is provided an image data selecting means that selects any of the image data stored in advance according to established number of uniform density regions set by the uniform density region number setting means.

Further, it is preferable that there is provided an image data processing means that processes the image data stored in advance according to the established number of uniform density regions, and processes them to new image data corresponding to the established number of uniform density regions.

It is preferable that an image data preparing means that prepares new image data corresponding to the aforesaid established uniform density region.

It is further preferable if there is provided an image data preserving means that preserves new image data obtained by the image data preparing means or by the image data processing means on the storage means.

It is further preferable that there are provided lines formed between a plurality of uniform density regions.

It is further preferable that the lines have density of not less than 2.0 when either one of the design basis diffusion density of the uniform density regions is not more than 1.5.

It is further preferable that the lines have density of not less than 2.0 when the design basis diffusion density of the uniform density regions is not more than 1.5.

Since the image-recording apparatus of item 61 is characterized in that a storage means that stores a plurality of image data corresponding to the structure of a part of a human body or to a test pattern wherein the aforesaid structure is copied, a selecting means that selects at least one of the aforesaid image data in accordance with a connected radiographing equipment, and a recording means that records a test pattern on a recording medium based on the selected image data, are provided, it is possible to select the image that is closest in terms of a shape to the image to be outputted in accordance with a radiographing apparatus that is intended to output images, for example, which makes it possible to evaluate more properly.

Since the image recording apparatus of item 62 is characterized in that a storage means that stores a plurality of image data corresponding to the structure of a part of a human body or to a test pattern wherein the aforesaid structure is copied, and a recording means that records a test pattern on a recording medium based on the image data and records information that shows the test pattern are provided, it is restrained that the test pattern mentioned above is taken for the actual image.

BRIEF DESCRIPTION OF THE DRAWINGS

Other objects and advantages of the present invention will become apparent upon reading the following detailed description and upon reference to the drawings in which:

FIGS. 6(a) through 6(h) are diagrams each of which illustrates a density setting method, and the axis of ordinates represents density, while, the axis of abscissas represents a signal value on the graph in the diagram;

FIG. 7(a), FIG. 7(b), FIG. 7(c), FIG. 7(d), and FIG. 7(e) are diagrams each of which illustrates a size setting method;

FIG. 8 is a diagram showing image examples relating to test patterns for sharpness and granularity each being established in terms of a direction.

DETAILED DESCRIPTION OF THE PREFERRED EMBODIMENT

Figure 1:
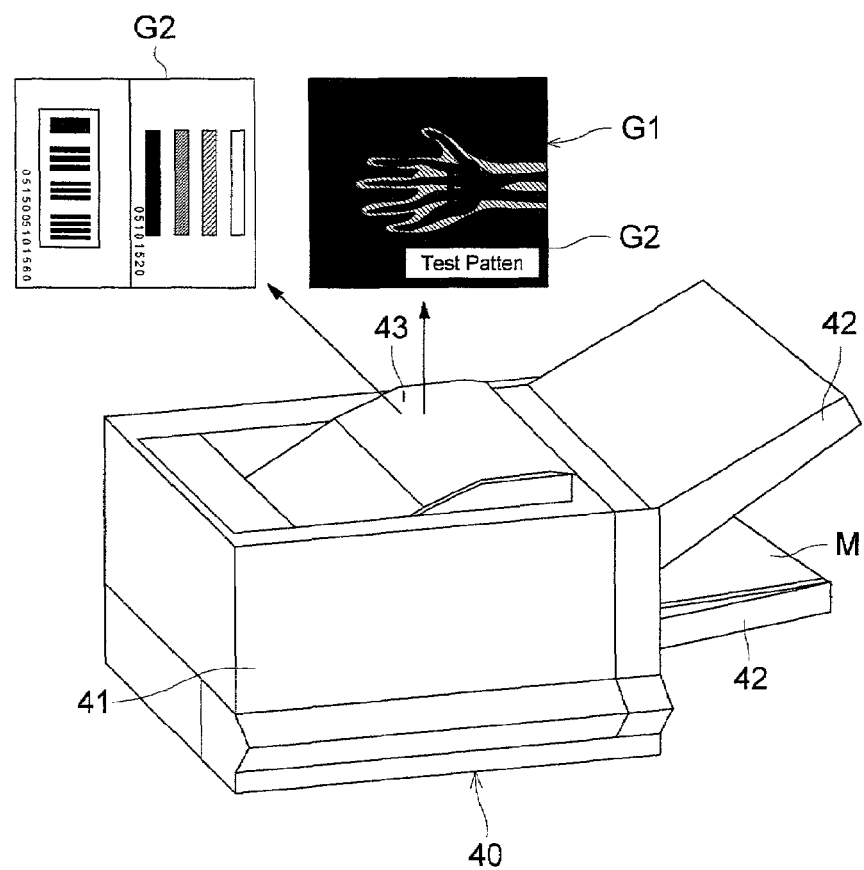
FIG. 1 is a perspective view of ink jet type recording apparatus 40 representing an image forming apparatus of the present embodiment.

The invention will be explained as follows, referring to the embodiment. FIG. 1 is a perspective view of ink jet type recording apparatus 40 representing an image forming apparatus of the present embodiment. In the ink jet type recording apparatus 40, inputted image signals are subjected to pseudo-continuous tone processing such as error diffusion or dither, and ink is stuck on a recording medium through an ink jet method based on the processed image signals, and thereby, an image having halftone, such as a medical image, can be formed. In the ink jet type recording apparatus 40, feeding tray 42 is mounted on apparatus main body 41 to be of two decks, for example, and recording medium M loaded on either one of the two decks, for example, loaded on lower feeding tray 42 is fed to the inside of the apparatus main body 41, and the recording medium M on which images G1 and G2 are formed is taken out to ejection section 43.

Figure 2:
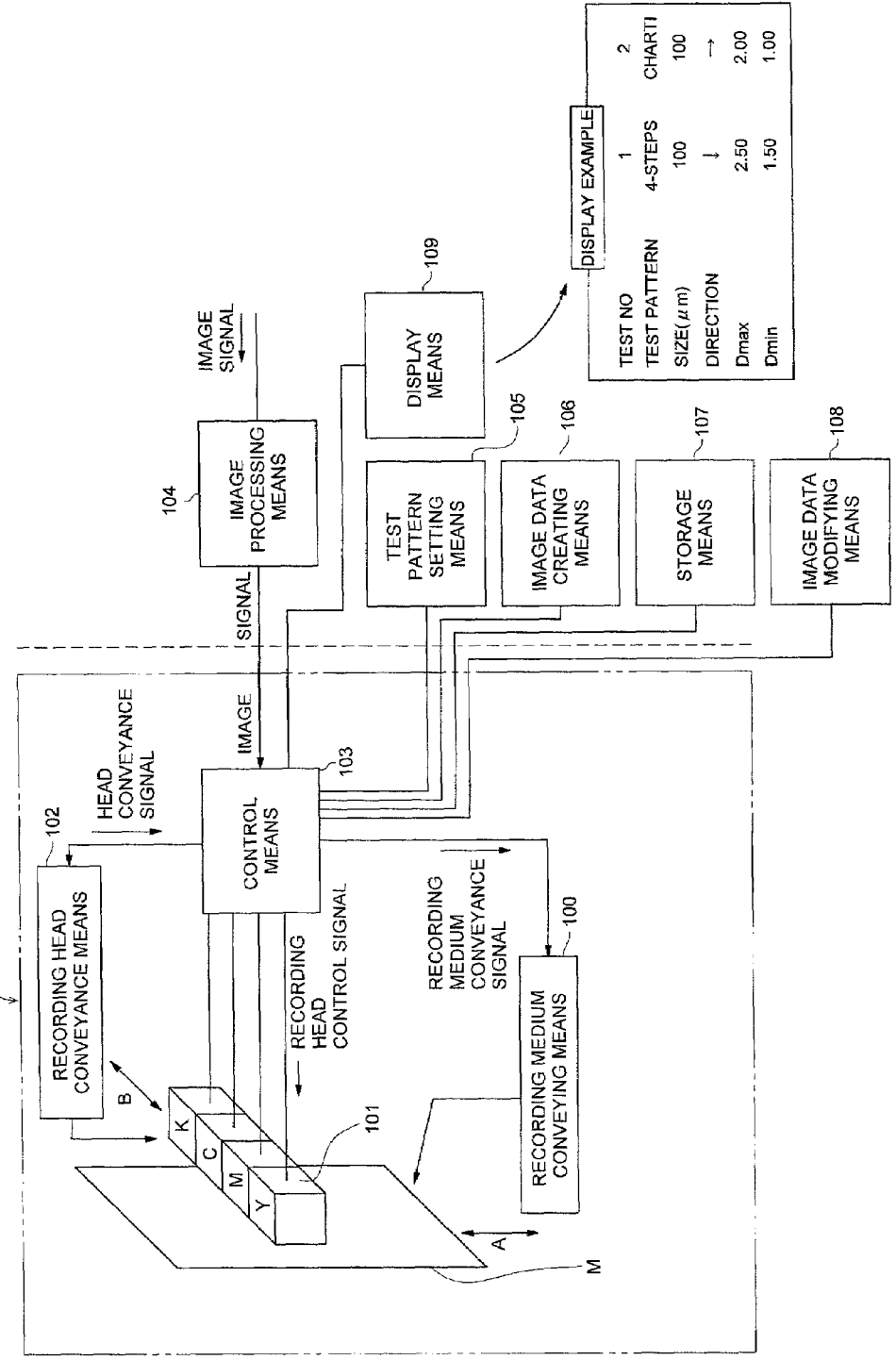
FIG. 2 is a block diagram showing a schematic structure of the ink jet type recording apparatus 40.

FIG. 2 is a block diagram showing a schematic structure of the ink jet type recording apparatus 40. On the ink jet type recording apparatus 40 of the present embodiment, there are provided recording medium conveyance means 100, recording head unit 101 representing a forming means, recording head conveyance means 102, control means 103, test pattern setting means 105, image data preparing means 106, storage means 107, image data preparing means 108 and display means 109(hereinafter, also serving as a printing-condition displaying section). The recording medium conveyance means 100 conveys recording medium M in the arrow direction (sub scanning direction) based on recording medium conveyance signals. The recording head unit 101 is arranged to be movable in the direction perpendicular to the conveyance direction for the recording medium M.

In the present embodiment, recording heads respectively for yellow (Y), magenta (M), cyan (C) and black (K) are provided to be brought into a line on the recording head unit 101. These heads may either be united solidly or be provided separately. The recording head conveyance means 102 moves the recording head unit in the direction of arrow B (main scanning direction) based on head conveyance signals coming from the control means 103, and each recording head forms an image on recording medium M based on recording head control signals (corresponding to image signals) coming from the control means 103.

Further, to the control means 103, there are connected the pattern setting means 105, the image data preparing means 106, the image means 107, the image data preparing means 108 and the display means 109. These means can also be replaced by a personal computer that is separate from the ink jet type recording apparatus 40.

Figure 3:
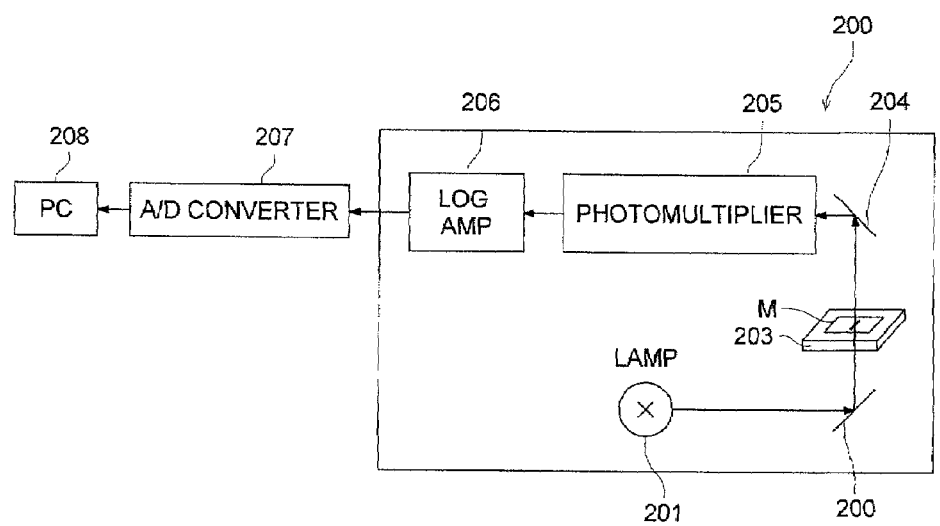
FIG. 3 is a diagram showing an outline of a micro-densitometer.
Figure 3:
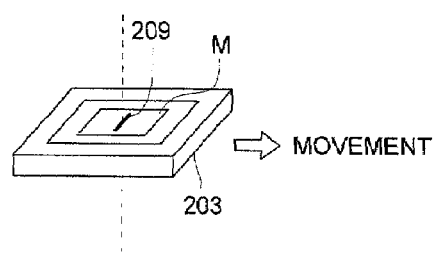

FIG. 3 is a diagram showing an outline of a micro-densitometer. In FIG. 3(a), light emitted from lamp 201 is reflected by mirror 202 and passes through recording medium M placed on stage 203 that is movable in the direction perpendicular to the optical axis, to be restricted in accordance with images stored, and then, enters photo-multiplier 205. Since the photo-multiplier 205 outputs electric signals corresponding to an amount of light received by the photo-multiplier 205, these are converted by log amplifier 206 into electric signals corresponding to density. Further, by connecting A/D converter 207 and personal computer 205 from the outside, A/D-converted digital data can be obtained by personal computer 208.

As shown in FIG. 3(b), a measurement section of the stage 203 is made by glass, and aperture 209 representing an area where light is projected on a recording medium is provided so that the longitudinal direction of the aperture 209 is in the direction perpendicular to the movement direction of the stage 203. In the course of measurement, the stage 203 is moved in the direction of an arrow in FIG. 3(b), and thereby light passing through the aperture 209 can scan the recording medium M in the direction of measurement thereof. Incidentally, the aperture 203 is 1000 µm in its longitudinal direction and is 10 µm in its lateral direction. When obtaining SWFT, MTF or WS, it is preferable to make the width in the lateral direction of the aperture 209 to be small, because a minute structure of the pattern recorded on the recording medium needs to be measured. When obtaining RMS, it is preferable to make the width in the lateral direction of the aperture 209 to be large, and in this case, RMS corresponding to visual evaluation can be obtained because the aperture 209 serves as a high-frequency-cut filter. The test pattern recorded in this way is measured by a micro-densitometer which is provided on ink jet type recording apparatus 40 or is separate.

Further, the stage 203 has a size of about 10–50 cm square, although it depends on a type of micro-densitometer 200. Therefore, when a size of recording medium M on which the test pattern is recorded exceeds a size of the stage 203, the recording medium M cannot be placed, or it is caught by a part of micro-densitometer 200. It is therefore necessary to make the recording medium M or the test pattern to be in an appropriate size.

For example, in the case of ink jet type recording apparatus 40 representing an image recording apparatus of medical use, it is a matter of course that the initial image forming capability needs to be kept high, and a decline of image quality caused by aging deterioration must be prevented. Therefore, it is necessary to evaluate image quality of images outputted from ink jet type recording apparatus 40 periodically, each time the power supply is turned on.

Contrary to the foregoing, in ink jet type recording apparatus 40 of the present embodiment, image data corresponding to one or more test patterns for quality evaluation are stored in storage means 107. The ink jet type recording apparatus 40 forms a test pattern established by test pattern setting means 105 based on image data, or forms a test pattern based on image data processed by image data processing means 108(or prepared newly by image data preparing means 106) while observing data displayed by display means 109, then, the test pattern is measured by a micro-densitometer, and the evaluation value based on the measurement is judged by control means 103 or by a separate evaluation device, and thus, sharpness and granularity are evaluated. When the evaluation proves to be inferior, a user or a service engineer changes recording conditions manually, or control device 103 changes recording conditions automatically, and thereby, image quality can be enhanced. Incidentally, as a setting method for test patterns, it is one way to set various numerical values as described later, but it is also possible to make a user to select the desired evaluation through clicking, after dividing the types of test patterns roughly into, for example, granularity, sharpness and human body. Or, it is also possible to employ the system wherein the patterns to be selected are changed on a rotary basis like "granularity→sharpness→human body →granularity" when an image quality evaluation button is pressed. Test pattern examples used for the evaluation of this type are shown in FIGS. 4 and 5.

Test Pattern for Sharpness Evaluation

As an index for evaluation of sharpness, SWTF or MTF is commonly used in the main. An example of a sharpness evaluation method in an image recording apparatus is a method wherein density of a test pattern image called a chart is measured by a micro-densitometer, and its density profile is used for conducting analyses.

Figure 4:
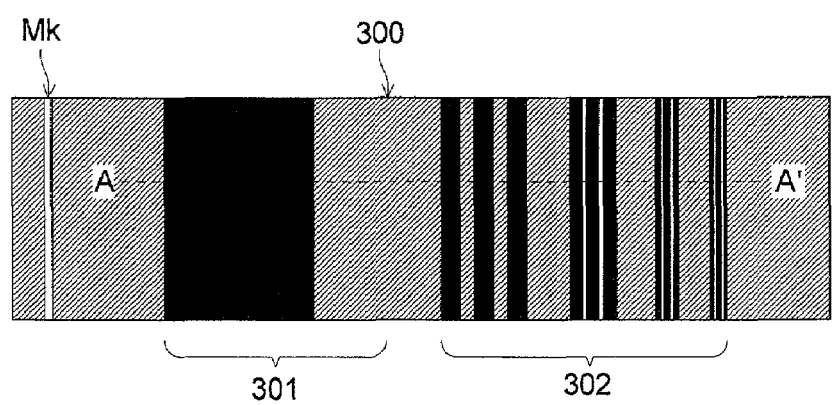
FIG. 4(a) and FIG. 4(b) are diagrams each of which illustrates an evaluation method for a test pattern for evaluating sharpness.
Figure 4:
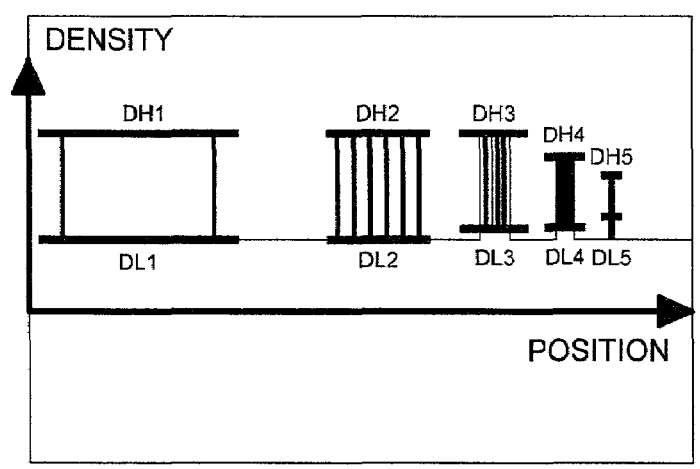

Test pattern image for sharpness evaluation 300 in FIG. 4(*a*) is a test pattern image for evaluation of sharpness. The evaluation of sharpness shown here corresponds to obtaining the aforesaid SWTF or MTF. Test pattern image for sharpness evaluation 300 has normalizing portion 301 where the spatial frequency is lowest and normalized portion 302 having other spatial frequencies. On the normalizing portion 301 or normalized portion 302 of the test pattern image for sharpness evaluation 300, there are formed a group of bars arranged at prescribed intervals in the main scanning direction (writing direction) of the recording apparatus. Hereafter, this group of bars is called a pattern element, and a group of pattern elements is called a chart.

SWTF is one called a rectangular wave response function as another name, and it is calculated generally in the following method. First, image data corresponding to a rectangular wave chart are prepared, then when images are recorded by the recording apparatus based on the image data, a rectangular wave chart image is obtained. For example, in the rectangular wave chart image having pattern elements in quantity of N, if pattern elements are numbered in the order wherein the lowest spatial frequency comes first, i=1 corresponds to normalizing spatial frequency, and i=2–N corresponds to normalized spatial frequency. A part of a peak owned by a profile of $i^{th}$ pattern element (i=1–N) is averaged to obtain density DHi at a high level and density DLi at a low level. By using these two values, contrast Ci (DHi−DLi)/(DHi+DLi) indicating the response of the recording apparatus is obtained. Since the frequency is extremely low at the normalizing section, the level is made to be one that does not cause deterioration of image sharpness. A value obtained by dividing the contrast of the normalized portion with the normalizing contrast, namely, the contrast ratio SWTF (ui)=Ci/Cl is made to be SWTF (ui). Incidentally, ui indicates spatial frequency owned by the $i^{th}$ pattern element.

Further, MTF is one that is called modulation transmission function as another name, and it corresponds to spatial frequency characteristics of sine wave response. A method to calculate MTF by using a rectangular wave chart. Smooth approximate curve SWTF (u) is prepared based on plotted point N of SWTF (ui) obtained by the aforesaid method, and the curve SWTF (u) is converted into MTF (u) by the expression of Goldman's equation. Details of the expression are described, for example, on pages 167–172 of "Radiation Image Information Engineering (I)" (written by Uchida, Kanamori and Inatsu and edited by Japan Radiation Technology Institute).

For example, FIG. 4(*a*) is a rectangular wave chart with N=5, and FIG. 4(*b*) shows density profile obtained by measuring the test pattern image 300 for sharpness evaluation in FIG. 4(*a*) in terms of density on section A–A' with micro-densitometer 200.

When measuring density by the use of micro-densitometer 200, it is preferable that bars of pattern elements are positioned to be in parallel with each other and pattern elements are positioned to be in parallel with each other, so that density of all pattern elements may be measured by a single scanning. It is preferable that a length of a bar (length in the direction that is mostly in parallel with measurement direction) is about 10 mm or more which makes it possible to measure density by avoiding scratches or dust sticking to the recording medium. Further, it is preferable that a size of recording medium on which one chart is recorded is 200 mm or less which makes it possible to place the recording medium on the stage 203 of micro-densitometer 200 and makes the recording medium not to be caught by micro-densitometer 200 to be free from troubles in measurement. If the test pattern image for sharpness evaluation 300 is recorded in an appropriate size in advance, it is not necessary to take the trouble to cut an excessive portion of the recording medium, which is convenient in handling.

Further, in the normalizing portion 301, it is preferable that the frequency is a low frequency, which does not cause attenuation of the contrast compared with a zero frequency, which should be the standard essentially for normalizing. There is no problem if the spatial frequency of not more than 0.5 cycle/mm is taken as a standard, though it depends on efficiency of the recording apparatus. Incidentally, the spatial frequency in the normalizing portion of a lead chart used in the intensifying-screen—film system is 0.05 cycle/mm.

With respect to the test pattern for sharpness evaluation 300, it is a tendency in most recording apparatuses that accuracy of recording is higher and measurement error is less on the lower frequency side. It is therefore preferable that the number of bars (number of cycles) is less on the lower frequency side, from the viewpoint of space saving. On the high frequency side, on the other hand, accuracy of recording is inferior and there occurs dispersion on contrast values of peaks. Therefore, it is preferable that the number of bars on the high frequency side is made to be as slightly large as 5–20 cycles, and an average value of their contrast values is obtained.

Further, when evaluating the sharpness in the ink-jet recording apparatus, since the resolution is relatively high compared to that in the image-recording apparatus employing the silver-halide laser recording method or the thermal-transfer recording method, it is desirable for the effective sharpness evaluation that the spatial frequency at the normalized portion is high. Concretely speaking, it is desirable that the sharpness-evaluating pattern has three or more than three pattern elements having a spatial frequency being equal to or higher than 2.0 cycle/mm, and further desirable that at least one of the pattern elements has such a very high spatial frequency that the width of a bar included in the pattern element is equivalent to several ink dots. For instance, in case of the ink-jet recording apparatus in which the minimum recording size (being equivalent to the highest resolution at an upper limit of its image forming capability) is 50 μm, provided that the spatial frequency at the normalized portion is 2.0–3.3–5.0–10.0 cycle/mm, the ink-jet recording apparatus can cover almost of all recordable spatial frequencies, resulting in a very effective sharpness-evaluation.

Image data corresponding to the basic test pattern are stored in storage means 107 of the ink jet type recording apparatus 40, and it is possible to print by changing print conditions of the foregoing by image data processing means 108. To be more concrete, it is considered to change a profiling-axis (for example, density and transmittance, or an inverse number of the transmittance) and a chart form corresponding to the profiling-axis (an ideal profile form given by the image data).

Incidentally, although the sharpness-evaluation in which the density is set at the profiling-axis is generally known, the scope of the present invention is not limited to the above. For instance, when transmittance is set at the profiling-axis, it becomes easy to determine whether a evaluation result is good or bad since the differences between the evaluation results can be distinguished more clearly than those in case of setting the density at the profiling-axis. In addition, when lightness is set at the profiling-axis, it becomes possible to obtain an evaluation result more equivalent to the visual inspection of human eyes, compared to those in case of setting the density at the profiling-axis. Further, although the sharpness-evaluation in which the pattern shape is set at the rectangular waveform is generally known, the scope of the present invention is not limited to the above. For instance, when the pattern shape is set at a sine wave, it becomes possible to directly calculate MTF (Modulation Transfer Function) without using the Coltman's conversion formula. In addition, when the pattern shape is set at a chopping wave, it becomes possible to evaluate not only the sharpness but also the smoothness of the density gradation. When the spatial frequency is changed, it is preferable to adjust the number of pattern elements or the number of bars constituting the pattern elements so that a size of the outputted image may be the same as others. This change includes selection and processing of the stored image data or preparing of image data which are entirely new. This makes it unnecessary to maintain a plurality of image data, and thereby, storage capacity of the storage section can be small.

Incidentally, when plural types of test patterns having different spatial frequencies, wave forms and numbers can be formed on the same recording medium, handling of test patterns is extremely convenient. These test patterns will be explained later. Further, as information of the test pattern, density, a chart wave form and each spatial frequency can also be recorded on the same recording medium for the test pattern.

It is further possible to form, in the vicinity of the position to start measuring density, position adjusting mark Mk which is almost in parallel with a bar. The position adjusting mark Mk is one to be used for adjusting the direction of aperture 209 of micro-densitometer 200 to be almost in parallel with the recording direction. By providing this position adjusting mark Mk, it makes it easy to see the position to start measuring, and it serves as a mark for position adjustment of a recording medium, which is a merit. Though two lines are used as position adjusting mark Mk in the present example, the mark may also be a square or a point without being limited to lines. Incidentally, an interval between the marks Mk is preferably broader than a width of aperture 209 of micro-densitometer 200, and it is preferable that the interval is changeable depending on the evaluation item, such as 20–100 μm for the test pattern image for evaluating sharpness and about 20–1000 μm for the test pattern image for evaluating granularity.

If the test pattern for sharpness evaluation 300 composed of the aforesaid structure is used, density can be measured easily, and sharpness can be evaluated. It is also possible to calculate SWTF and MTF by normalizing the contrast at each spatial frequency with a standard of normalized spatial frequency of not more than 0.5 cycle/mm. Further, when scratches and dust come into existence on the image, it is possible to measure by avoiding the portion of the scratch and dust, which makes it unnecessary to prepare the test patter again and to cut to an appropriate size, so that handling is simple. Further, it is possible to conduct desired evaluation of sharpness by setting chart forms variously.

Test Pattern for Granularity Evaluation

As an index for evaluation of sharpness, RMS or WS is commonly used in the main. An example of a sharpness evaluation method in an image recording apparatus is a method wherein density of a test pattern image called a patch is measured by a micro-densitometer, and its density profile is used for conducting analyses.

Figure 5A:
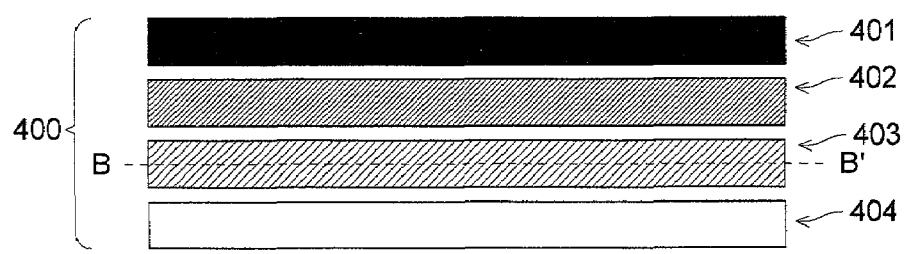
FIGS. 5(a) and FIG. 5(b) are diagrams each of which illustrates an evaluation method for a test pattern for evaluating granularity.
Figure 5B:
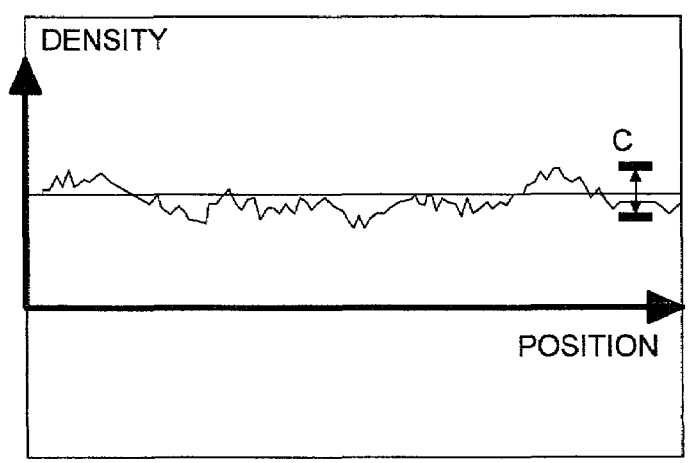

Test pattern image for granularity evaluation 400 in FIG. 5(a) is a test pattern image for evaluation of granularity. The evaluation of granularity shown here corresponds to obtaining the aforesaid RMS or WS. In test pattern image for granularity evaluation 400 in FIG. 5(a), patches 401–404 each having different density are formed in the recording direction in a way that each patch extends in the main scanning direction (writing direction). Incidentally, a patch is an image which has a prescribed area where density can be measured and has density that is mostly uniform. FIG. 5(b) shows a density profile obtained by measuring, by means of micro-densitometer 200, the density on B–B' section of patch 403 out of the test pattern image for granularity evaluation 400 in FIG. 5(a).

RMS (Root Mean Square) is an index showing the degree of density dispersion. A profile is obtained by measuring the density of a solid image having the mostly uniform density obtained by printing image data having uniform signal values. The standard deviation of its density distribution is RMS. For example, in FIG. 5(a), width C of dispersion of the density profile corresponds to RMS, and granularity is judged to be worse when RMS is greater.

WS (Wiener Spectrum) means spatial frequency characteristics of granularity noise added to an image To be concrete, the square of the value obtained by Fourier-transforming the profile from which the trend of density profile is removed corresponds to WS.

In FIG. 5(a), measurement by a diffusion densitometer (not shown) and by micro-densitometer 200 is easy, because patches 401–404 are almost in the same size and are arranged to be almost in parallel with each other, which is preferable.

Further, it is preferable that the patch size has an area which includes a 5×5 mm area and does not include 200× 200 mm. Aforesaid 200 mm is a size of a recording medium which can be arranged on stage 209 of micro-densitometer 200 and does not cause troubles for measurement such as that the recording medium is caught by micro-densitometer 200, and in the case of a size that is not more than this size, it is not necessary to take the trouble to cut the recording medium in the case of measurement. Further, aforesaid 5 mm is a minimum size, which can be measured by micro-densitometer 200 in the non-measurement direction (direction that is almost perpendicular to the measurement direction) by avoiding scratches and dust generated on the recording medium.

Since dispersion of density is caused on the portion where scratches and dust sticking, it is considered a method to lower statistical dispersion by increasing the number of data. For that purpose, it is necessary to have a certain size in the measurement direction. For measuring by avoiding the portion of scratches and dust, it is necessary to have a certain size in the vertical direction. With regard to the number of patches and density, it is possible to designate an optional value by test pattern setting means 105, or they can be changed by image data processing means 108.

Further, if a length in the measurement direction is made to be in a range from 30 mm to 200 mm, it is possible to obtain the sufficient number of data for measurement of one line, which is more preferable. Further, if a length in the non-measurement direction is made to be in a range from 10 mm to 200 mm, it is possible to increase the number of data by measuring continuously for several lines instead of measurement for only one line, which is more preferable.

In addition, if a patch size is made to be in a range from 30 mm to 100 mm for the measurement direction and in a range from 10 mm to 50 mm for the non-measurement direction, the size turns out to be one wherein a plurality of patches may be grouped in the same test pattern, and density of patches can be measured without cutting the patches separately, which makes measurement to be more easy and is more preferable.

With respect to the appropriate number of patches, it is preferable to set to 3–20 patches to grasp granularity sufficiently for entire density region. Further, the number of 3–6 patches is in an appropriate measurement number, which makes it possible to grasp the tendency of granularity characteristics, which is further preferable.

If the test pattern image for granularity evaluation 400 composed of the aforesaid structure is used, density can be measured easily, and granularity can be evaluated. When scratches and dust come into existence on the image, it is possible to measure by avoiding the portion of the scratch and dust, which makes it unnecessary to prepare the test pattern again and to cut to an appropriate size. Further, it is possible to calculate RMS and WS with high accuracy of measurement, because sufficient number of data can be obtained. Further, it is possible to conduct desired evaluation of granularity by setting the number of patches.

When forming the aforesaid test pattern in the way stated above, it is possible to establish density of the patterns for evaluation of sharpness and granularity by test pattern setting means 105 of ink jet type recording apparatus 40, and further it becomes possible to form a test pattern that is more appropriate. FIGS. 6(*a*) through 6(*h*) are explanatory illustrations for explaining the density setting method, in which horizontal axes of the graphs indicate the signal values and vertical axes of the graphs indicate densities. With respect to either a transmission density or a reflection density, test pattern setting means 105, serving as a density setting means and an image data selecting means (simply, also referred to as a selecting means), can set the output density of the test pattern by setting either Dmax and Dmin as shown in FIG. 6(*a*) or Dave (the average value of Dmax and Dmin) and ΔD (the density difference: Dmax−Dmin) as shown in FIG. 6(*b*). The information pertaining to at least two of the abovementioned four densities allow test pattern setting means 105 to arbitrarily set the output density of the test pattern. Further, when one density factor can be freely changeable by user, for instance, in such a manner that ΔD can be set at an arbitral value by user while Dave is always fixed at constant, or Dmax can be set at an arbitral value by user while Dmin is always fixed at constant, the density setting operation becomes easy, resulting in improvement of a maneuverability of the user. Incidentally, in the density setting operation, there would be a case that the user can select either one of or a plurality of options determined in advance and another case that the user should be input entirely new value(s).

In place of using density difference ΔD=Dmax−Dmin, its mesial magnitude (amplitude from density center) may also be used. In the selection of density of this kind, when evaluation of image quality in mammography is assumed, Dmax and Dmin can be established to be slightly high. When evaluating reverse-text characteristics in CT images and MR images, Dmax of the test pattern for sharpness evaluation can be set to 3.0 and Dmin can be set to the lowest density.

Though it is normal that Dmax indicates the highest density in the outputted image and Dmin indicates the lowest density in the outputted image, it is also considered that the density with a distinctive feature in the test pattern is made to be Dmax or Dmin. For example, the highest density among plural patches is made to be Dmax and the lowest density is made to be Dmin for the test pattern for evaluating granularity, while, density at high level is made to be Dmax and density at low level is made to be Dmin for the pattern for evaluating sharpness. If Dmax and Dmin are defined as in this example, density of the test pattern can be grasped in advance.

In the present embodiment, optional density can be set simply on the test pattern.

Incidentally, either one of the aforesaid two parameters can be fixed in advance for easy selection. Information about density can be recorded in the vicinity of the test pattern. In this case, it is possible to consider (1) that information about density is combined with image data, or (2) that a column for information is provided separately. When selecting density, though it is preferable to combine it with image data in advance, it is possible either to provide a column for information or to record information concerning density. When setting optional density, providing a column for information is preferable, but it is also considered to add to image data when processing images.

Information about density may be density value established (or not established), or density value inputted, or parameters such as Dmax, Dmin, Dave or ΔD. Incidentally, with regard to a definition of Dmax and Dmin, the highest density is made to be Dmax and the lowest density is made to be Dmin when there are a plurality of density as in the test pattern for evaluating granularity shown in FIG. 6(*c*). On the other hand, in the case of the test pattern for sharpness shown in FIG. 6(*d*), density on the portion where the pattern is formed is made to be Dmax and density on the foundation portion where the pattern is not formed is made to be Dmin, because density is uniform in many cases.

Each of FIGS. 6(e)–6(h) is a diagram showing how Dmax is changed while Dmin is fixed. FIG. 6(e) shows an original image based on the first setting. What is shown in FIG. 6(f) is one obtained by compressing a density range for the image shown in FIG. 6(e) with Dmax representing the highest density on the entire image and Dmin representing the lowest density. The boundary line was recognized as the highest density, and this density was used as a standard for density change, thus, the boundary line turned out to be the same as it was established. However, it is not possible to confirm whether the patch density is suitable for evaluation or not until the test patter is outputted, because density change of the patch is made based on density setting for Dmax and Dmin simultaneously.

FIG. 6(g) shows an original image based on the second establishment. What is shown in FIG. 6(h) is one obtained by compressing a density range for the image shown in FIG. 6(g) with Dmax representing the highest density on the patch and Dmin representing the lowest density on the patch. At least the patch density to be evaluated is the same as the established density and it turned out to be suitable for evaluation.

Incidentally, if each data has information relating to its maximum signal value (highest density) and minimum signal value (lowest density), it is convenient to select and process the image data. Further, it is preferable that each image data has information relating to its own amount of characteristics (for example, highest and lowest density of patch, DH and Dl of chart).

In the present embodiment, it is possible to set optional density in the test pattern, in a simple way.

Incidentally, in the pattern for evaluation of sharpness, it is preferable that pattern elements each having a different spatial frequency are arranged periodically at mostly the same amplitude. On the other hand, if patches are arranged at the same density interval in the test pattern for evaluation of granularity, it is easy to see the density, which is convenient. Further, in the mammography, it is necessary to evaluate image quality for high density of not more than 4.0 in term of transmission density, because a focus which is minute compared with an ordinary region sometimes needs to be detected, and an image with high density contrast needs to be read on a high intensity viewing box accordingly. Further, if a plurality of test patterns which are mostly the same each other are recorded, appropriate evaluation can be conducted even when density varies depending on the position of a recording medium under the influence of uneven development, and it can also be used for making mutual precisions to agree with each other by evaluating the same sample with separate facilities or instruments.

When forming the aforesaid test pattern in the way stated above, it is possible to establish density of the patterns for evaluation of sharpness and granularity by test pattern setting means 105 of ink jet type recording apparatus 40, and further to establish sizes, which makes it possible to form a test pattern that is more appropriate. FIG. 7 is a diagram for illustrating how to establish sizes.

Test pattern setting means 105 of ink jet type recording apparatus 40 is a pixel size setting means for setting a size of a pixel corresponding to one pixel of image data and is a pixel size selecting means, while, control device 103 serves as an interpolation processing means that conducts interpolation processing for enlargement or reduction on image data, depending on the established pixel size. Namely, when a pixel size is established by the test pattern setting means 105, the control device 103 enlarges or reduces the image appropriately depending on the established pixel size and that image is recorded on recording medium M.

For example, when either one of the sizes is established (selection type establishment) by the test pattern setting means 105 under the situation that image data corresponding to three sizes of test patterns P1–P3 are stored in storage means 107 as shown in FIG. 7(a), the test pattern in the desired size is recorded. A size that is the same as a pixel size outputted by a conventional recording apparatus may also be included in choices. Incidentally, as a mode for the selection, it is also considered a mode wherein a table is prepared in advance as a set of a pixel size and density as shown in FIG. 7(c), and a manual including the pixel size and density is distributed, or the pixel size and density are stored in storage means 107 in a way that they appear from time to time, so that a user is made to establish the number (No.) corresponding to the desired test pattern, in addition to a mode to select a pixel size and density as a parameter as shown in FIG. 7(b).

On the other hand, it is also possible to record a test pattern by inputting a numerical value (establishment by inputting a numerical value) from test pattern preparing means 104, for example, with a size other than the three sizes. A number of four figures or a number of three figures is enough for inputting a numerical value.

FIG. 7(d) is a diagram showing an outline of an interpolation processing method. In FIG. 7(d), when a pixel size is the same as a unit recording size in a recording head of ink jet type recording apparatus 40, it is possible to obtain a test pattern by outputting without conducting interpolation processing. However, when the pixel size is not the same as the unit recording size, the interpolation processing needs to be conducted. Incidentally, the interpolation processing method, which is known, includes a simple interpolation processing method, a linear interpolation processing method and a spline interpolation processing method, and an effect of each interpolation processing method is different from others. For example, when the pixel size is equal to an integral multiple of the unit recording size (twice in FIG. 7(d)), the desired test pattern can be obtained if the image data enlarged by the use of some interpolation processing method is prepared. When smoothing is not required, a simple interpolation processing method to simply enlarge image data to the integral multiple can be used, and when smoothing is required, a respective interpolation processing method can be used depending on each use. When the pixel size is a non-integral multiple of the unit recording size (1.5 times in FIG. 7(d)), however, some smoothing effect is applied, because a simple interpolation processing method is impossible. It is important to evaluate interpolation processing methods because an interpolation processing method or an influence of the interpolation processing method on image quality (image data) is changed depending on the relationship between a pixel size and the unit recording size.

FIG. 7(e) is a diagram showing a method to select images corresponding to three types of pixel sizes stored in advance in a storage means and thereby to form test patterns which are mostly in the same size. In this case, if image data relating to the same image with pixel sizes each being different in types are stored, necessity for applying smoothing is reduced and image quality is improved when obtaining a test pattern in an optional size by enlarging the stored image data to the integral multiple, which is an effect.

Incidentally, it is also considered a method to store in advance a plurality of image data wherein the image data are mostly the same but interpolation processing methods only are different. In this case, it is possible to evaluate interpolation methods. When processing image data corresponding to each pixel size based on image data stored in advance, "interpolation processing (image processing)" for interpolation processing needs to be conducted, which is not preferable. When preparing image data, the problem is not in existence, in particular.

On the contrary, it is also possible to determine the size of a test pattern based on the numerical value inputted. In this case, it is convenient if an actual recording size of the test pattern recorded on recording medium M can be set by a test pattern setting means representing a recording size setting means, and if it is possible to record on recording medium M according to the pixel size thus set. In the case of the foregoing, it is preferable that information (pixel size, interpolate-scaling factor and interpolation processing method) about a recording size of the test pattern can be recorded. What is stated above is the same for the pattern for evaluating sharpness and for the pattern for evaluating granularity.

The foregoing makes it possible to output the test pattern with an optional pixel size and an optional image size, and thereby to evaluate image quality appropriately and to evaluate an interpolation processing method considered to have an influence on sharpness.

In addition, when forming the test pattern stated above, the test pattern setting means 105 of ink jet type recording apparatus 40 makes it possible to set test patterns for evaluating sharpness and granularity in the image direction and thereby to form the test pattern which is more appropriate. FIG. 8 is a diagram showing an example of the image relating to the test patterns for sharpness and granularity whose directions have been set.

FIG. 8($a$) represents original images with which the evaluation in the main scanning direction can be conducted. FIG. 8($b$) represents images representing the test patterns for evaluating sharpness and granularity in FIG. 8($a$) both rotated by 90° with which the evaluation in the sub-scanning direction can be conducted. Since a main cause for deterioration of image quality varies depending on the scanning direction, it is important to conduct image quality evaluation for each scanning direction. For example, in the case of an ink jet type, recording accuracy (skew of a nozzle or the like) can be evaluated by measurement in the main scanning direction, and conveyance efficiency for a recording medium can be evaluated by measurement in the sub-scanning direction.

FIG. 8($c$) represents images representing the test patterns for evaluating sharpness and granularity in FIG. 8($a$) both rotated by 180° with which how uneven development appears is known in the case of a silver halide photography type, and recording accuracy by position can be evaluated in the case of an ink jet type, both respecting granularity. On the other hand, with respect to sharpness, recording accuracy by position can be evaluated in the case of an ink jet type. Further, when recording a plurality of test patterns on a sheet of recording medium, a desired layout can be formed. However, it is preferable to arrange so that density may surely be conducted in one direction.

Figures 9A, 9B, 9C:
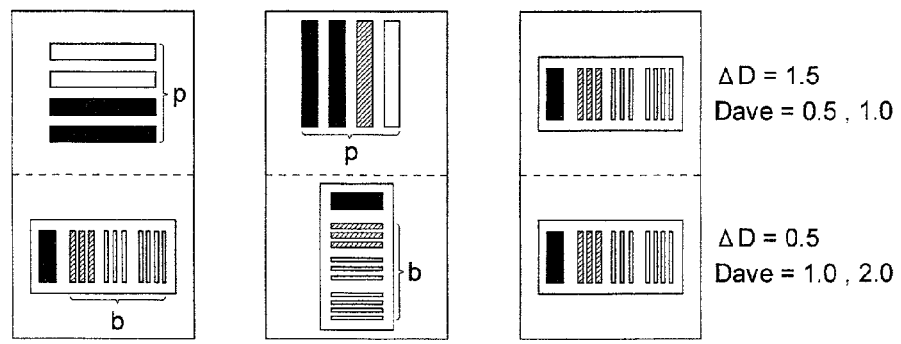
FIGS. 9(a) through 9(g) are diagrams each of which shows the format example.
Figures 9D, 9E:
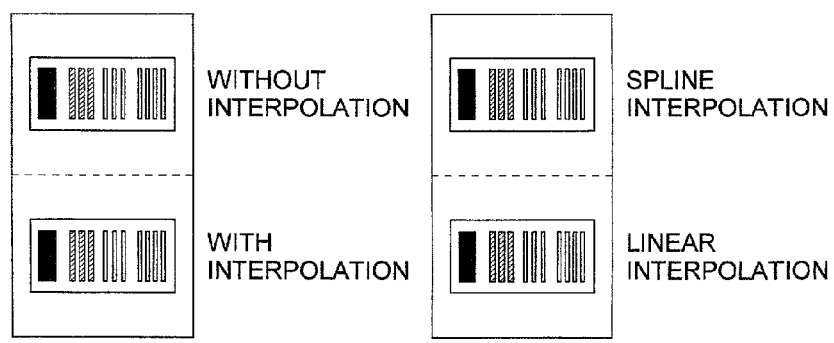
Figures 9F, 9G:
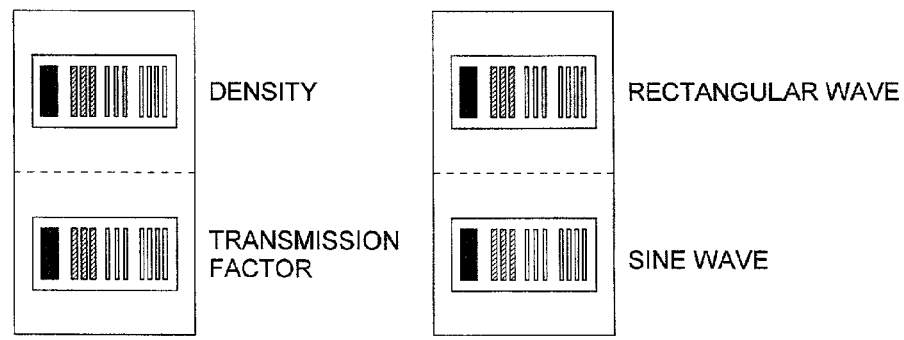

In addition, when forming the test pattern stated above, it is possible to set a format wherein test patterns for evaluating sharpness and granularity are combined by test pattern setting means 105 of ink jet type recording apparatus 40, and thereby to form a test pattern which is more appropriate. FIG. 9 is a diagram showing an example of formats.

In the example for each of FIGS. 9($a$) and 9($b$), the pattern for evaluating sharpness and the pattern for evaluating granularity are formed on the same recording medium. In FIG. 9($a$), patches p extend in the main scanning direction (writing direction) of the recording apparatus, and bars b are arranged, and thereby, evaluation of image quality in the main scanning direction can be conducted on a sheet of recording medium.

In the example of FIG. 9($c$), test patterns for evaluating sharpness each having different density are formed on the same recording medium. When Dave is changed with $\Delta D$ being fixed, evaluation of sharpness in the case of changing density contrast can be conducted, and when $\Delta D$ is changed with Dave being fixed, evaluation of sharpness in the case of changing average density can be conducted.

In the example of FIG. 9($d$), one pixel of image data is recorded on a life-size basis as a unit recording size (without interpolation), and one pixel is recorded on a non-life-size basis of a unit recording size (with interpolation), and for both of them, test patterns for evaluating sharpness which are almost in the same size are formed on the same recording medium. By virtue of this, an effect of image interpolation processing can be confirmed.

In the example of FIG. 9($e$), test patterns for evaluating sharpness having different interpolation processing methods such as linear interpolation and spline interpolation are formed on the same recording medium. By virtue of this, it is possible to confirm an influence of each interpolation processing method exerted on sharpness.

In the example of FIG. 9($f$), test patterns for evaluating sharpness having different profile axes are formed on the same recording medium. By virtue of this, it is possible to obtain SWTF and MTF at an appropriate profiling-axis depending on a use.

In the example of FIG. 9($g$), test patterns for evaluating sharpness having different chart wave forms are formed on the same recording medium. By virtue of this, it is possible to evaluate sharpness by different MTF analyzing methods.

Test pattern setting means 105 makes it possible to establish the number of test patterns to be recorded on a sheet of recording medium and combinations of a plurality of test patterns, while, display means (establishment display means) 109 makes it possible to display the established contents, and it is preferable that the established information is totally recorded on the recording medium. In particular, information (pixel size or the like) for which the print conditions are not easily specified unless that information is recorded is required to be recorded. With regard to information (evaluation items or the like) for which the print conditions are easily specified even when that information is not recorded, recording of that information may be omitted. When considering that a plurality of test patterns are sometimes split, it is preferable that information is recorded for each test pattern.

It is preferable that the combination of test patterns includes a combination of different evaluation items stated above, a combination of different density, a combination of different pixel sizes, a combination of different interpolation processing methods and a combination of different image directions. Further, in the case of a test pattern for evaluating sharpness, it is preferable that a combination of different number of pattern elements, a combination of different spatial frequencies, a combination of different profile axes and a combination of different chart wave forms are also included. Furthermore, in the case of a test pattern for evaluating granularity, it is preferable that a combination of different number of patches is also included.

It is preferable that a plurality of test patterns, which are mostly the same, can be recorded, and information of setting each test pattern can be stored in the aforesaid recording medium together with the test pattern. When a plurality of test patterns are recorded, it is preferable to record a boundary line together with and between adjoining test patterns. It is preferable that the boundary line of this kind is of black printing for a white background and void printing for a black background.

The number of test patterns on the same recording medium is preferably 2–8, and it is preferable that the number is 2–8 for investigating position-dependency of uneven density in the case of evaluation of granularity, for example, the number is 2–6 for evaluating at various density regions in the case of evaluation of sharpness, and the number is 2–8 for investigating position-dependency of uneven density in the case of human body images.

When a plurality of test patterns are grouped into one as stated above, one sheet of recording medium 8 makes it possible to evaluate plural types of image quality, recording medium can be saved, and test patterns grouped into one sheet are easily handled (control, measurement, etc.), which is advantageous.

It is possible to select at least one of image data in accordance with a radiographing apparatus connected to ink jet type recording apparatus 40 and to record a test pattern (image G1 in FIG. 1) on recording medium M based on the selected image data, by recording plural types of image data obtained by radiographing a part of a human body or a phantom or of image data obtained by copying the images, on recording means 107 of the ink jet type recording apparatus 40, as test patterns for overall evaluation of image quality. In this case, since it is possible to select, as a test pattern, the image closest to an image outputted, in accordance with a radiographing apparatus from which an image is intended to be outputted, for example, the overall evaluation of image quality can be conducted appropriately. The radiographing apparatus in this case includes an X-ray radiographing apparatus, an X-ray computer tomographic radiographing apparatus (X-ray CT apparatus), a magnetic resonance image forming apparatus (MRI apparatus), a supersonic image diagnostic apparatus, an electronic endoscope and a fundus camera, to which, however, the invention is not limited.

Further, image G1 can also be recorded by recording head unit 101 representing a recording means on recording medium M together with information GI showing a test pattern, and therefore, it is restrained that such test pattern is taken for the actual image. Various pieces of information such as marks, symbols and colored frames in addition to characters are considered as information GI showing the test pattern.

Incidentally, it is also considered that image data relating to recommended images of test patterns are stored in accordance with radiographing regions and modalities, and the image data are called according to circumstances to meet the request from a user. For example, with regard to CT, MR and CR, test patterns for evaluation for them are made to be different from each other, because density levels of images are different and requested image quality levels are different each other. There are considered test patterns such as "evaluation of reverse-text characteristics is important because characters are described together on CT image (for example, the test pattern wherein Dmax equals highest density and Dmin equals lowest density needs to be prepared surely)" or "evaluation of image quality at high density can be conducted for mammography".

The test pattern recorded in this way is measured by a micro-densitometer (FIG. 3), which is equipped on ink jet type recording apparatus 40 or is separate.

Incidentally, it is preferable to give a boundary line to the test pattern, because patches can be discriminated easily. Density in design basis may either be transmission density or be diffusion density. A constant amplitude for the test pattern for evaluation of sharpness is preferable.

Though an example of using an ink jet recording system as a recording means has been explained in each embodiment, the recording system does not need to be limited to the ink jet recording system in the invention, and a silver halide laser recording system, a thermal transfer recording system, or further, an impact type recording system such as a wire dot recording system, or recording systems other than the foregoing can be applied. Further, it is not necessary to limit to a serial recording system, and the so-called line recording system can also be used.

Further, although image-recording apparatus for medical use are mainly exemplified in the above descriptions, the application of the present invention is not limited to the abovementioned applications of the image-recording apparatus. The present invention can be applied for wide variety of the fields in which the digital printers are employed.

Still further, the application of the present invention is not limited to the monochrome image formation. The present invention can be also applied to the color image formation in which primary colors of Y (Yellow), M (Magenta), C (Cyan), K (Black) or primary colors of R (Red), G (Green), B (Blue) are combined to form a color image.

Still further, the image data of the test-pattern would be stored in advance not only in the image-recording apparatus but also in image-capturing apparatus, including a X-ray radiographing apparatus, a X-ray computerized tomography, a magnetic resonance image-forming apparatus, an ultrasonic image diagnosis apparatus, an electronic endoscope, a fundus camera, etc., but the scope of image-capturing apparatus is not limited to them.

As stated above, the invention makes it possible to provide an image recording apparatus wherein a test pattern for physical evaluation can be recorded on a recording medium under various established recording conditions (output density, sizes, formats), especially in an image recording apparatus for medical use storing therein image data corresponding to test pattern images.

Further, the invention makes it possible to provide an image recording apparatus wherein a test pattern, which is sufficient to conduct physical evaluation such as those for granularity and sharpness and is easy to easy to conduct density measurement, is recorded Further, the invention makes it possible to provide an image recording apparatus wherein a test pattern for overall evaluation, which can evaluate image quality of images objectively, can be recorded. In addition, among other things, the test pattern, embodied in the present invention, is useful for evaluating a medical image.

Disclosed embodiment can be varied by a skilled person without departing from the spirit and scope of the invention.

What is claimed is:

1. An apparatus for printing a medical image on a recording medium, comprising:
   a printing section to print either said medical image or a test-pattern for evaluating a quality of said medical image, on said recording medium, based on image data;
   a printing-condition setting section to set a printing condition for printing said test-pattern; and
   a printing-condition displaying section to display said printing condition set by said printing-condition setting section, wherein said printing section prints at least one of a sharpness-evaluating pattern and a granularity-evaluating pattern, and wherein said sharpness-evaluating pattern includes more than four kinds of pattern elements, spatial frequencies of said pattern elements are different relative to each other and in each of which 1 to 20 periods of each spatial frequency is aligned.

2. The apparatus of claim 1, further comprising:

an image data creating section to create a new image data based on said printing condition set by said printing-condition setting section.

3. The apparatus of claim 1, further comprising:

a storing section to store said image data; and wherein said storing section stores at least one set of image data corresponding to said test-pattern to be printed on said recording medium.

4. The apparatus of claim 1, wherein a plurality of test-patterns, being substantially the same each other, can be printed on said recording medium.

5. The apparatus of claim 4, wherein border lines between said plurality of test-patterns are also printed on said recording medium.

6. The apparatus of claim 1, wherein said printing-condition setting section includes a density-setting section to set a density of said medical image, based on a combination of at least two of the following factors including: a maximum density (Dmax) of said test-pattern in terms of either a transmission density or a reflection density; a minimum density (Dmin) of said test-pattern corresponding to said maximum density (Dmax); an average value (Dave) of said maximum density (Dmax) and said minimum density (Dmin); and a density difference $\Delta D$, where $\Delta D = Dmax - Dmin$.

7. The apparatus of claim 6, further comprising:

an image data creating section to create a new image data based on said density set by said density-setting section.

8. The apparatus of claim 6, wherein both said test-pattern and said density set by said density-setting section are printed on said recording medium.

9. The apparatus of claim 6, further comprising:

a storing section to store said image data; and wherein said storing section stores at least one set of image data corresponding to said test-pattern to be printed on said recording medium.

10. The apparatus of claim 9, further comprising:

an image data selecting section to select any one of image data sets, which are stored in advance in said storing section corresponding to densities set by said density-setting section; and wherein said storing section stores at least two of said image data sets, which are different from each other in image-signal values so that test-patterns printed on said recording medium are substantially the same each other except said densities.

11. The apparatus of claim 9, further comprising:

an image data processing section to generate new image data sets corresponding to said densities by processing said image data sets stored in advance in said storing section.

12. The apparatus of claim 1, wherein said printing-condition setting section includes a pixel-size setting section to set a pixel-size of one pixel included in said image data; and further comprising:

an interpolate-processing section to apply an interpolate-processing for either expansion or a reduction of said medical image to said image data, in response to said pixel-size set by said pixel-size setting section.

13. The apparatus of claim 12, further comprising:

an image data creating section to create a new image data based on said pixel-size set by said pixel-size setting section.

14. The apparatus of claim 12, wherein said printing-condition setting section includes an interpolate-processing method setting section to set interpolate-processing method for either expanding or a reducing of said medical image.

15. The apparatus of claim 12, wherein both said test-pattern and interpolate-processing information pertaining to said interpolate-processing applied by said interpolate-processing section are printed on said recording medium, and said interpolate-processing information includes at least one of the following factors including: said pixel-size, an interpolate-processing method, and an interpolate-scaling factor.

16. The apparatus of claim 12, further comprising:

a storing section to store said image data; and wherein said storing section stores at least one set of image data corresponding to said test-pattern to be printed on said recording medium.

17. The apparatus of claim 16, further comprising:

an image data selecting section to select any one of a plurality of image data sets, which are stored in advance in said storing section corresponding to pixel-sizes set by said pixel-size setting section; and wherein said storing section stores at least two of said image data sets, which are different from each other in an amount of image data so that test-patterns printed on said recording medium are substantially the same to each other except image-sizes of said test-patterns.

18. The apparatus of claim 16, further comprising:

an image data processing section to generate new image data sets corresponding to said pixel-sizes by processing said image data sets stored in advance in said storing section.

19. The apparatus of claim 1, further comprising:

an image-direction setting section to set an image-direction of said medical image printed on said recording medium.

20. The apparatus of claim 19, further comprising:

an image data creating section to create a new image data based on said image-direction set by said image-direction setting section.

21. The apparatus of claim 19, wherein both said test-pattern and information pertaining to said image-direction, set by said image-direction setting section, are printed on said recording medium.

22. The apparatus of claim 19, further comprising:

a storing section to store said image data; and wherein said storing section stores at least one set of image data corresponding to said test-pattern to be printed on said recording medium.

23. The apparatus of claim 22, further comprising:

an image data selecting section to select any one of a plurality of image data sets, which are stored in advance in said storing section corresponding to image-directions, set by said image-direction setting section; and wherein said storing section stores at least two of said image data sets, which are different from each other in said image-direction so that test-patterns printed on said recording medium are substantially the same to each other except image-directions of said test-patterns.

24. The apparatus of claim 22, further comprising:
an image data processing section to generate new image data sets corresponding to image-directions, set by said image-direction setting section, by processing said image data sets stored in advance in said storing section.

25. The apparatus of claim 1, further comprising:
a pattern-number setting section to set a number of test-patterns to be printed on said recording medium.

26. The apparatus of claim 25,
wherein a plurality of test-patterns can be printed on said recording medium.

27. The apparatus of claim 26,
wherein said printing-condition setting section includes a combination setting section to set a combination of test-patterns when said pattern-number setting section sets a number of said test-patterns, and said combination of said test-patterns is one of the following combinations of: different evaluating items, different densities, different pixel-sizes, different interpolate-processing methods, different interpolate-scaling factors, and different image-directions.

28. The apparatus of claim 26,
wherein, when said pattern-number setting section sets a number of said plurality of test-patterns, border lines between said plurality of test-patterns are also printed on said recording medium.

29. The apparatus of claim 1,
wherein a spatial frequency of a normalized pattern element, being one of said pattern elements and having a lowest spatial frequency among them, is not greater than 0.5 cycle/mm.

30. The apparatus of claim 29,
wherein 5 to 20 periods of each spatial frequency are aligned in each of said pattern elements other than said normalized pattern element.

31. The apparatus of claim 1,
wherein a width of each of said pattern elements in a read-scanning direction is in a range of 10 to 200 mm.

32. The apparatus of claim 1, further comprising:
a storing section to store said image data; and
wherein said storing section stores at least one set of image data corresponding to said sharpness-evaluating pattern to be printed on said recording medium.

33. The apparatus of claim 32,
wherein at least two sets of image data are stored in said storing section so that numbers of pattern elements in sharpness-evaluating patterns, to be printed on said recording medium, are different from each other.

34. The apparatus of claim 33, further comprising:
an image data selecting section to select any one of a plurality of image data sets, which are stored in advance in said storing section corresponding to said numbers of said pattern elements.

35. The apparatus of claim 33, further comprising:
an image data processing section to generate new image data sets corresponding to said numbers of said pattern elements by processing said image data sets stored in advance in said storing section.

36. The apparatus of claim 32, further comprising:
an image data creating section to create a new image data based on a number of pattern elements in said sharpness-evaluating pattern.

37. The apparatus of claim 29,
wherein said printing-condition setting section includes a spatial frequency setting section to set said spatial frequency of said pattern element.

38. The apparatus of claim 37,
wherein more than two image data sets with respect to sharpness-evaluating patterns, in which at least one of said more than two image data sets of spatial frequencies of pattern elements is different relative to each other, are stored in a storing section.

39. The apparatus of claim 38, further comprising:
an image data selecting section to select any one of said image data sets, which are stored in advance in said storing section corresponding to said spatial frequencies of said pattern elements.

40. The apparatus of claim 37, further comprising:
an image data processing section to generate new image data sets corresponding to spatial frequencies of pattern elements by processing said image data sets stored in advance in said storing section.

41. The apparatus of claim 1,
wherein said printing-condition setting section includes a profiling-axis setting section to set a profiling-axis of a pattern element.

42. The apparatus of claim 41,
wherein said profiling-axis setting section sets said profiling-axis at either a density, a lightness or a transmittance.

43. The apparatus of claim 41,
wherein at least two of image data sets, which are different from each other in image-signal values so that sharpness-evaluating patterns printed on said recording medium are substantially the same to each other except said profiling-axis, are stored in a storing section.

44. The apparatus of claim 41, further comprising:
an image data selecting section to select any one of a plurality of image data sets, which are stored in advance in a storing section corresponding to said profiling-axis of said pattern elements.

45. The apparatus of claim 41, further comprising:
an image data processing section to generate new image data sets corresponding to said profiling-axis of said pattern element by processing said image data sets stored in advance in a storing section.

46. The apparatus of claim 41, further comprising:
an image data creating section to create a new image data based on said profiling-axis of said pattern element.

47. The apparatus of claim 1,
wherein said printing-condition setting section includes a waveform setting section to set a waveform of a pattern element at either a rectangular wave, a chopping wave or a sine wave.

48. The apparatus of claim 47, further comprising:
an image data selecting section to select any one of a plurality of image data sets, which are stored in advance in a storing section corresponding to said waveform of said pattern element.

49. The apparatus of claim 47, further comprising:
an image data processing section to generate new image data sets corresponding to said waveform of said pattern element by processing said image data sets stored in advance in a storing section.

50. An apparatus for printing a medical image on a recording medium, comprising:
a printing section to print either said medical image or a test-pattern for evaluating a quality of said medical image, on said recording medium, based on image data;
a printing-condition setting section to set a printing condition for printing said test-pattern; and
a printing-condition displaying section to display said printing condition set by said printing-condition setting section,
wherein said printing section prints at least one of a sharpness-evaluating pattern and a granularity-evaluating pattern, and
wherein said granularity-evaluating pattern has 3 to 20 uniform density regions, each of which has a uniform density being different from others and includes an area of 5 mm×5 mm but does not exceed an area of 200 mm×200 mm.

51. The apparatus of claim 50,
wherein said printing-condition setting section includes a density-region setting section to set a number of said uniform density regions.

52. The apparatus of claim 51, further comprising:
an image data selecting section to select any one of a plurality of image data sets, which are stored in advance in a storing section corresponding to said number of said uniform density regions set by said density-region setting section.

53. The apparatus of claim 51,
wherein, when design diffusion densities of said uniform density regions are not greater than 1.5, each line formed between said uniform density regions has a density not smaller than 2.0.

54. The apparatus of claim 1,
wherein said apparatus is a ink-jet printer, and said sharpness-evaluating pattern includes three or more pattern elements having a spatial frequency being equal to or more than 2.0 cycle/mm at a normalized portion.

55. The apparatus of claim 50, further comprising:
an image data creating section to create a new image data based on said printing-condition set by said printing-condition setting section.

56. The apparatus of claim 50, further comprising:
a storing section to store said image data; and
wherein said storing section stores at least one set of image data corresponding to said test-pattern to be printed on said recording medium.

57. The apparatus of claim 50,
wherein a plurality of test-patterns, being substantially the same each other, can be printed on said recording medium.

58. The apparatus of claim 57,
wherein border lines between said plurality of test-patterns are also printed on said recording medium.

59. The apparatus of claim 50,
wherein said printing-condition setting section includes a density-setting section to set a density of said medical image, based on a combination of at least one of factors including: a maximum density (Dmax) of said test-pattern in term of either a transmission density or a reflection density; a minimum density (Dmin) of said test-pattern corresponding to said maximum density (Dmax); an average value (Dave) of said maximum density (Dmax) and said minimum density (Dmin); and a density difference ΔD, where ΔD=Dmax−Dmin.

60. The apparatus of claim 59, further comprising:
an image data creating section to create a new image data based on said density set by said density-setting section.

61. The apparatus of claim 59,
wherein both said test-pattern and said density set by said density-selling section are printed on said recording medium.

62. The apparatus of claim 59, further comprising:
a storing section to store said image data; and
wherein said storing section stores at least one set of image data corresponding to said test-pattern to be printed on said recording medium.

63. The apparatus of claim 62, further comprising:
an image data selecting section to select any one of a plurality of image data sets, which are stored in advance in said storing section corresponding to densities set by said density-selling section; and
wherein said storing section stores at least two of said image data sets, which are different from each other in image-signal values so that test-patterns printed on said recording medium are substantially the same each other except said densities.

64. The apparatus of claim 62, further comprising:
an image data processing section to generate new image data sets corresponding to said densities by processing said image data sets stored in advance in said storing section.

65. The apparatus of claim 50,
wherein said printing-condition setting section includes a pixel-size setting section to set a pixel-size of one pixel included in said image data; and
further comprising:
an interpolate-processing section to apply an interpolate-processing for either expansion or a reduction of said medical image to said image data, in response to said pixel-size set by said pixel-size setting section.

66. The apparatus of claim 65, further comprising:
an image data creating section to create a new image data based on said pixel-size set by said pixel-size setting section.

67. The apparatus of claim 65,
wherein said printing-condition setting section includes an interpolate-processing method setting section to set interpolate-processing method for either expanding or a reducing of said medical image.

68. The apparatus of claim 65,
wherein both said test-pattern and interpolate-processing information pertaining to said interpolate-processing applied by said interpolate-processing section are printed on said recording medium, and said interpolate-processing information includes at least one of the following factors including: said pixel-size, an interpolate-processing method and an interpolate-scaling factor.

69. The apparatus of claim 65, further comprising:
a storing section to store said image data; and
wherein said storing section stores at least one set of image data corresponding to said test-pattern to be printed on said recording medium.

70. The apparatus of claim 69, further comprising:
an image data selecting section to select any one of a plurality of image data sets, which are stored in advance in said storing section corresponding to pixel-sizes set by said pixel-size setting section; and
wherein said storing section stores at least two of said image data sets, which are different from each other in an amount of image data so that test-patterns printed on said recording medium are substantially the same to each other except image-sizes of said test-patterns.

71. The apparatus of claim 69, further comprising:
an image data processing section to generate new image data sets corresponding to said pixel-sizes by processing said image data sets stored in advance in said storing section.

72. The apparatus of claim 50, further comprising:
an image-direction setting section to set an image-direction of said medical image printed on said recording medium.

73. The apparatus of claim 72, further comprising:
an image data creating section to create a new image data based on said image-direction set by said image-direction setting section.

74. The apparatus of claim 72,
wherein both said test-pattern and information pertaining to said image-direction, set by said image-direction setting section, are printed on said recording medium.

75. The apparatus of claim 72, further comprising:
a storing section to store said image data; and
wherein said storing section stores at least one set of image data corresponding to said test-pattern to be printed on said recording medium.

76. The apparatus of claim 75, further comprising:
an image data selecting section to select any one of a plurality of image data sets, which are stored in advance in said storing section corresponding to image-directions, set by said image-direction setting section; and
wherein said storing section stores at least two of said image data sets, which are different from each other in said image-direction so that test-patterns printed on said recording medium are substantially the same to each other except image-directions of said test-patterns.

77. The apparatus of claim 75, further comprising:
an image data processing section to generate new image data sets corresponding to image-directions, set by said image-direction setting section, by processing said image data sets stored in advance in said storing section.

78. The apparatus of claim 50, further comprising:
a pattern-number setting section to set a number of test-patterns to be printed on said recording medium.

79. The apparatus of claim 78,
wherein a plurality of test-patterns can be printed on said recording medium.

80. The apparatus of claim 79,
wherein said printing-condition setting section includes a combination setting section to set a combination of test-patterns when said pattern-number setting section sets a number of said test-patterns, and said combination of said test-patterns is one of the following combinations of: different evaluating items, different densities, different pixel-sizes, different interpolate-processing methods, different interpolate-scaling factors and different image-directions.

81. The apparatus of claim 79,
wherein, when said pattern-number setting section sets a number of said plurality of test-patterns, border lines between said plurality of test-patterns are also printed on said recording medium.

\* \* \* \* \*